Nov. 13, 1962     J. D. BUSEY ETAL     3,063,203
GRINDER
Filed Aug. 27, 1959     15 Sheets-Sheet 1
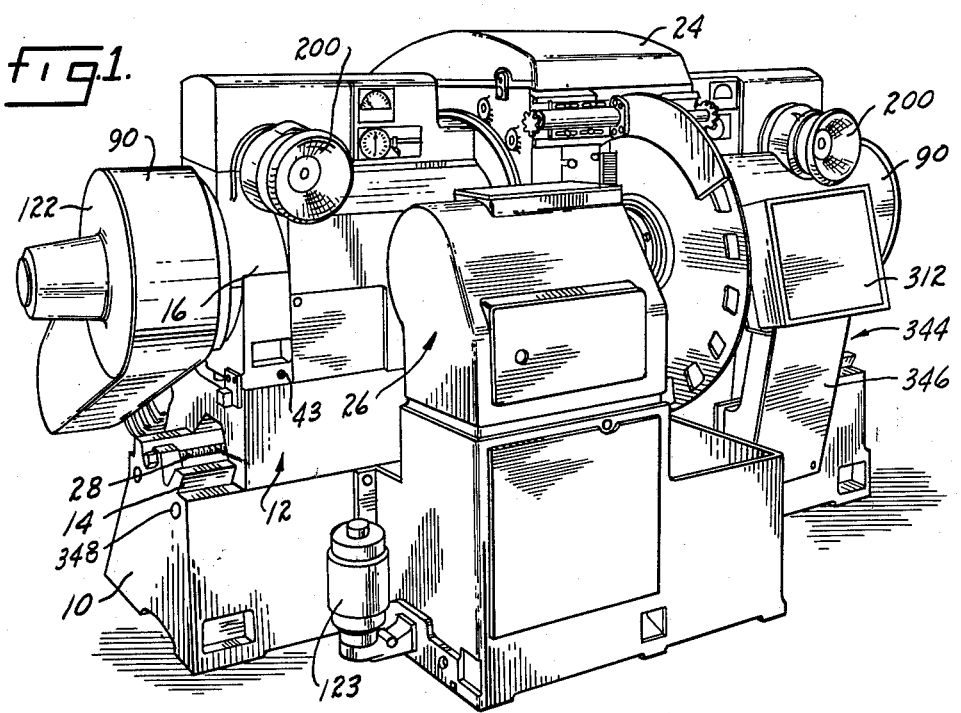
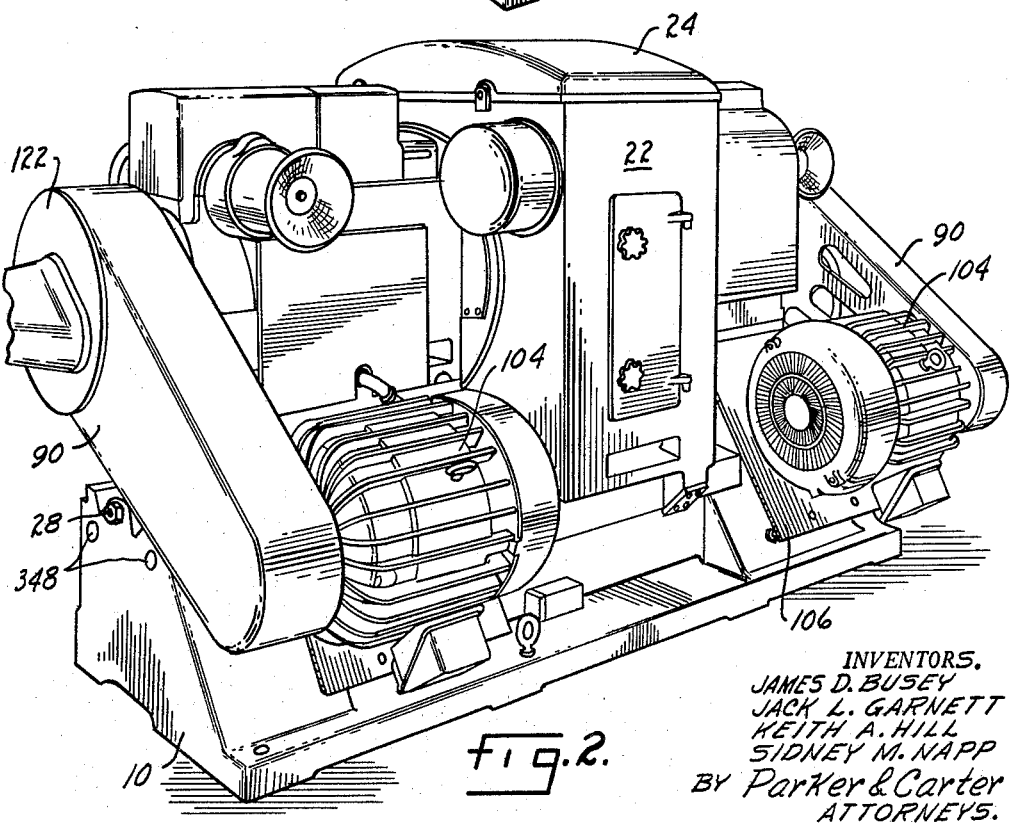
INVENTORS.
JAMES D. BUSEY
JACK L. GARNETT
KEITH A. HILL
SIDNEY M. NAPP
BY Parker & Carter
ATTORNEYS.

Nov. 13, 1962  J. D. BUSEY ETAL  3,063,203
GRINDER
Filed Aug. 27, 1959  15 Sheets-Sheet 2
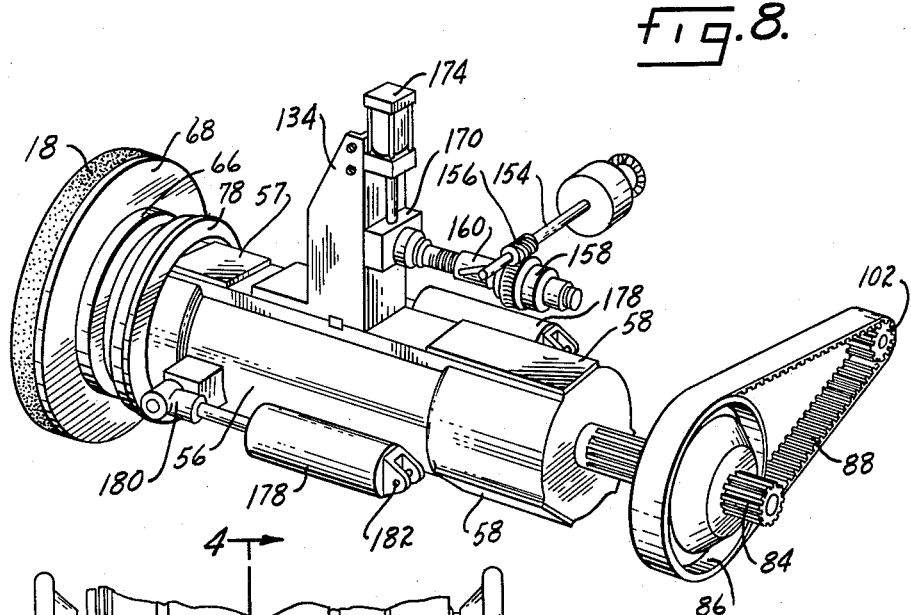
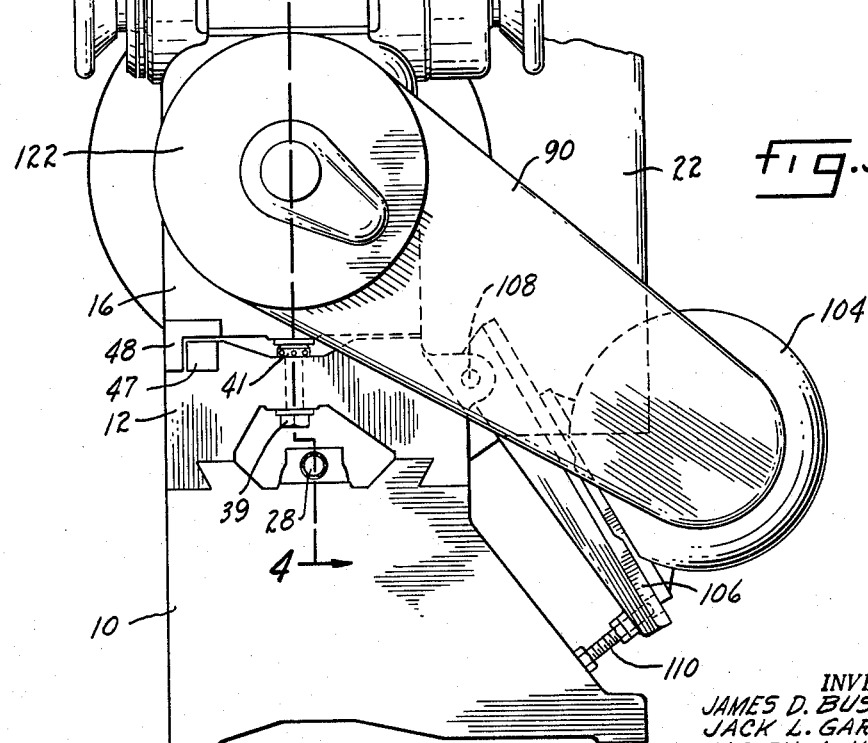
INVENTORS.
JAMES D. BUSEY
JACK L. GARNETT
KEITH A. HILL
SIDNEY M. NAPP
BY Parker & Carter
ATTORNEYS.

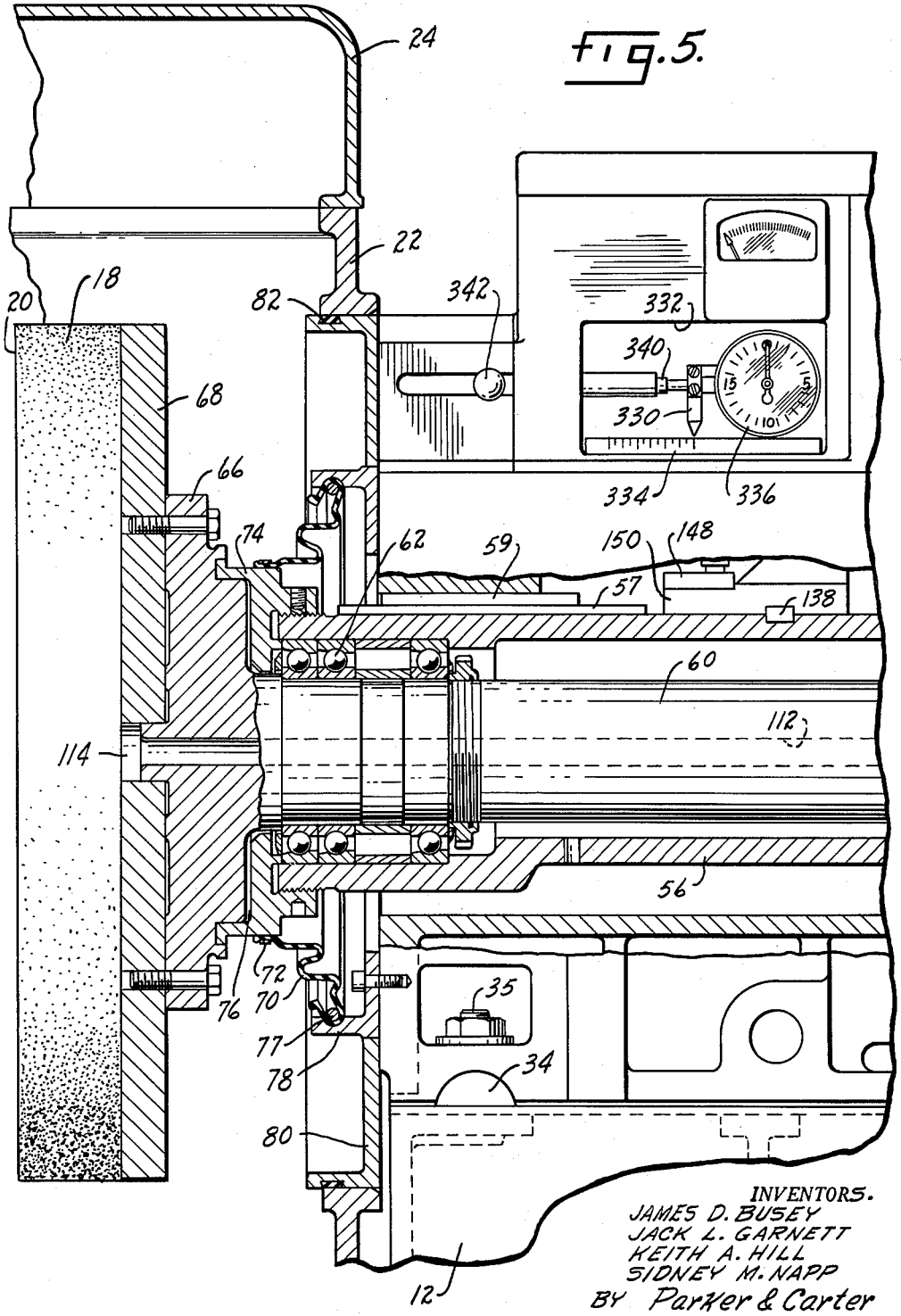

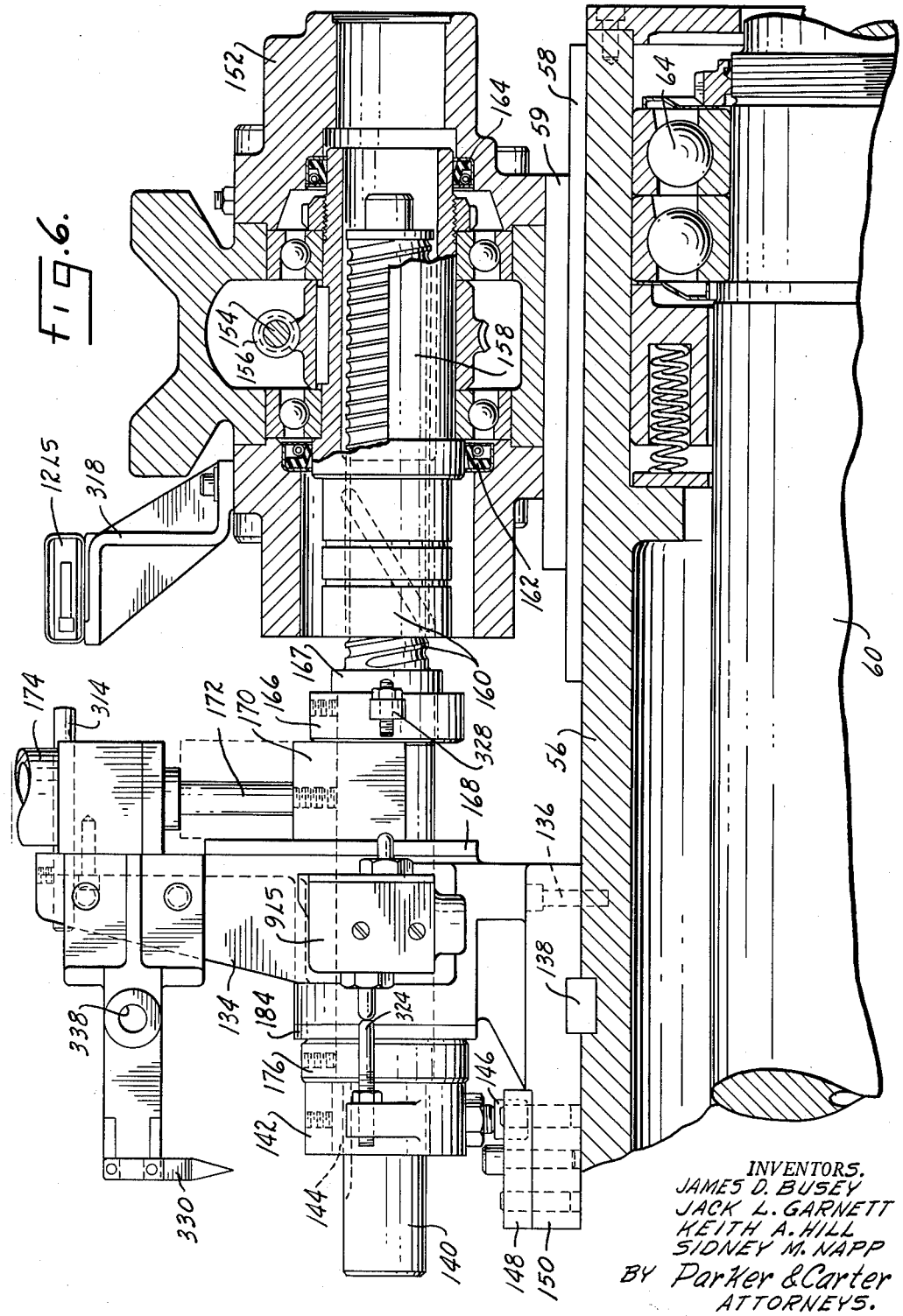

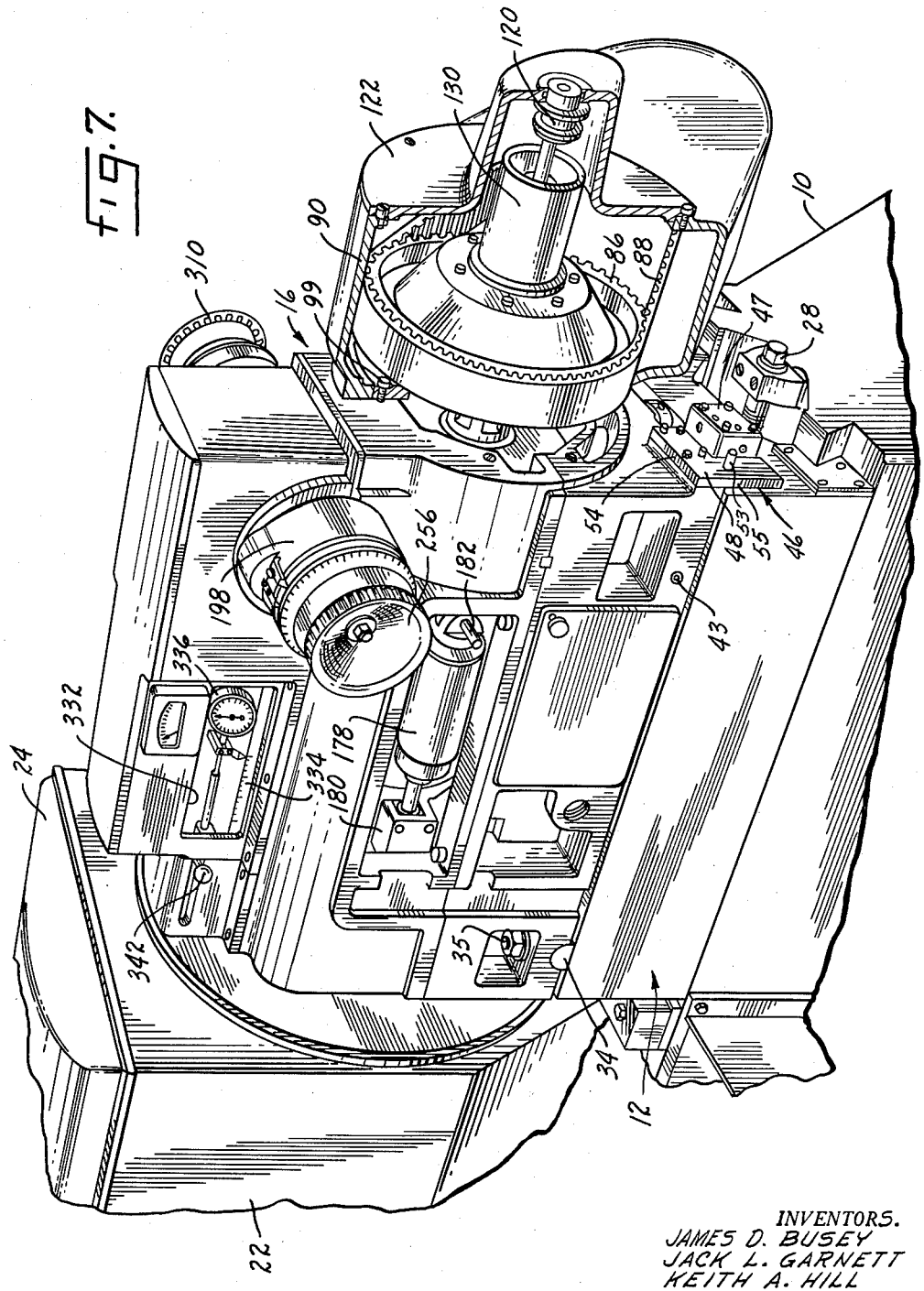
Nov. 13, 1962     J. D. BUSEY ETAL     3,063,203
GRINDER
Filed Aug. 27, 1959     15 Sheets-Sheet 6
INVENTORS.
JAMES D. BUSEY
JACK L. GARNETT
KEITH A. HILL
SIDNEY M. NAPP
BY *Parker & Carter*
ATTORNEYS.

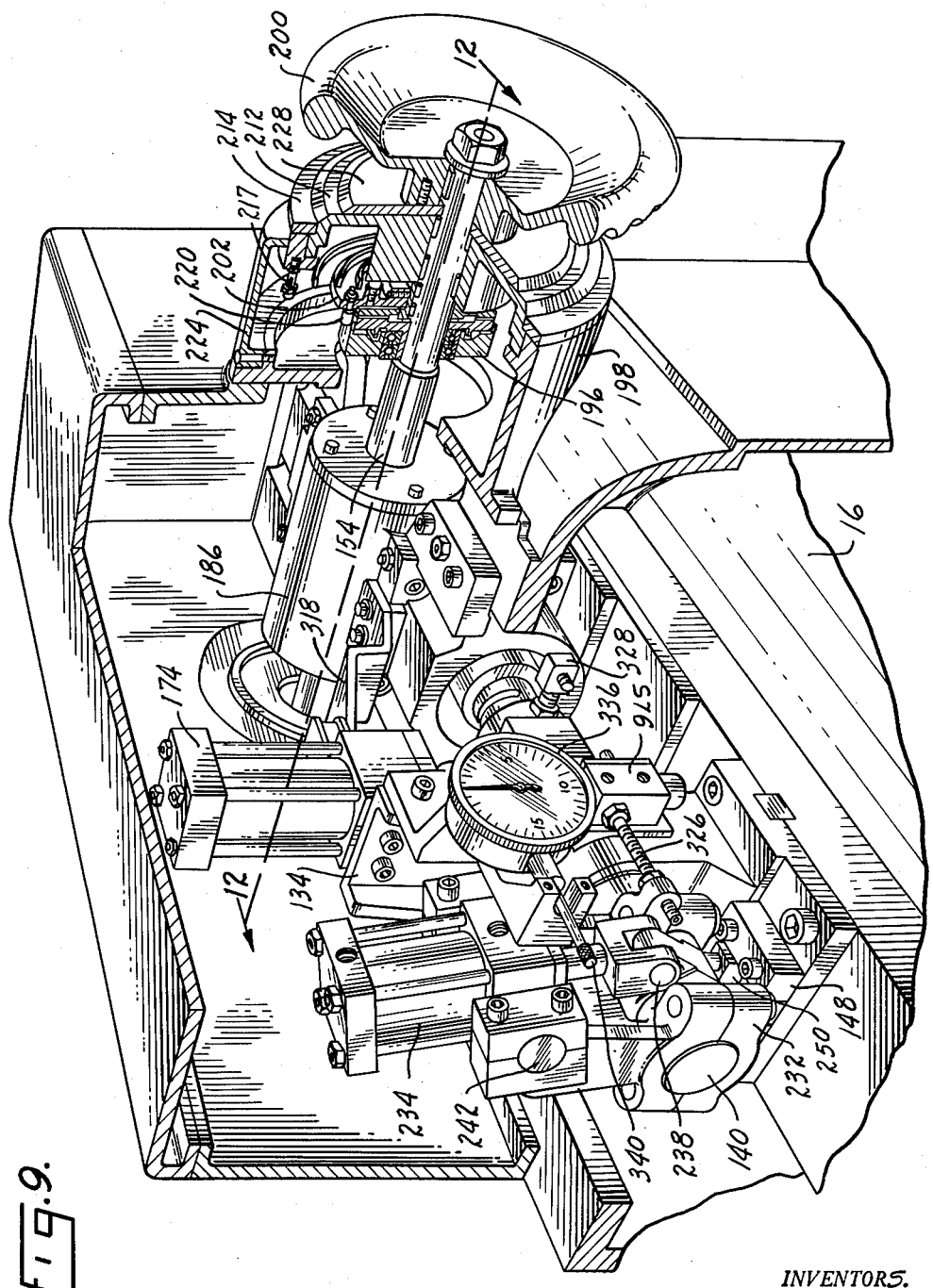

Nov. 13, 1962  J. D. BUSEY ETAL  3,063,203
GRINDER
Filed Aug. 27, 1959  15 Sheets-Sheet 8
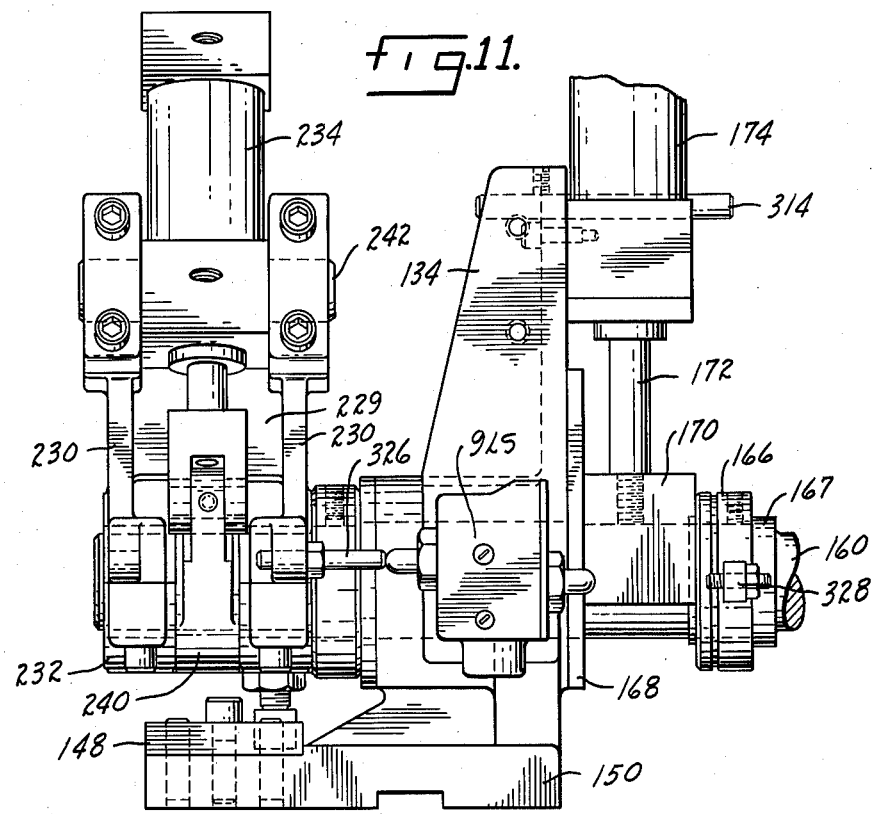
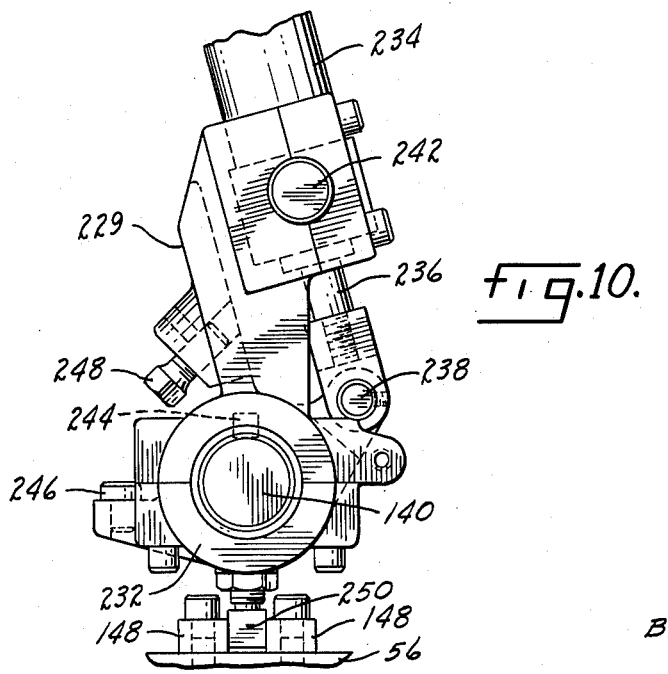
INVENTORS.
JAMES D. BUSEY
JACK L. GARNETT
KEITH A. HILL
SIDNEY M. NAPP
BY Parker & Carter
ATTORNEYS.

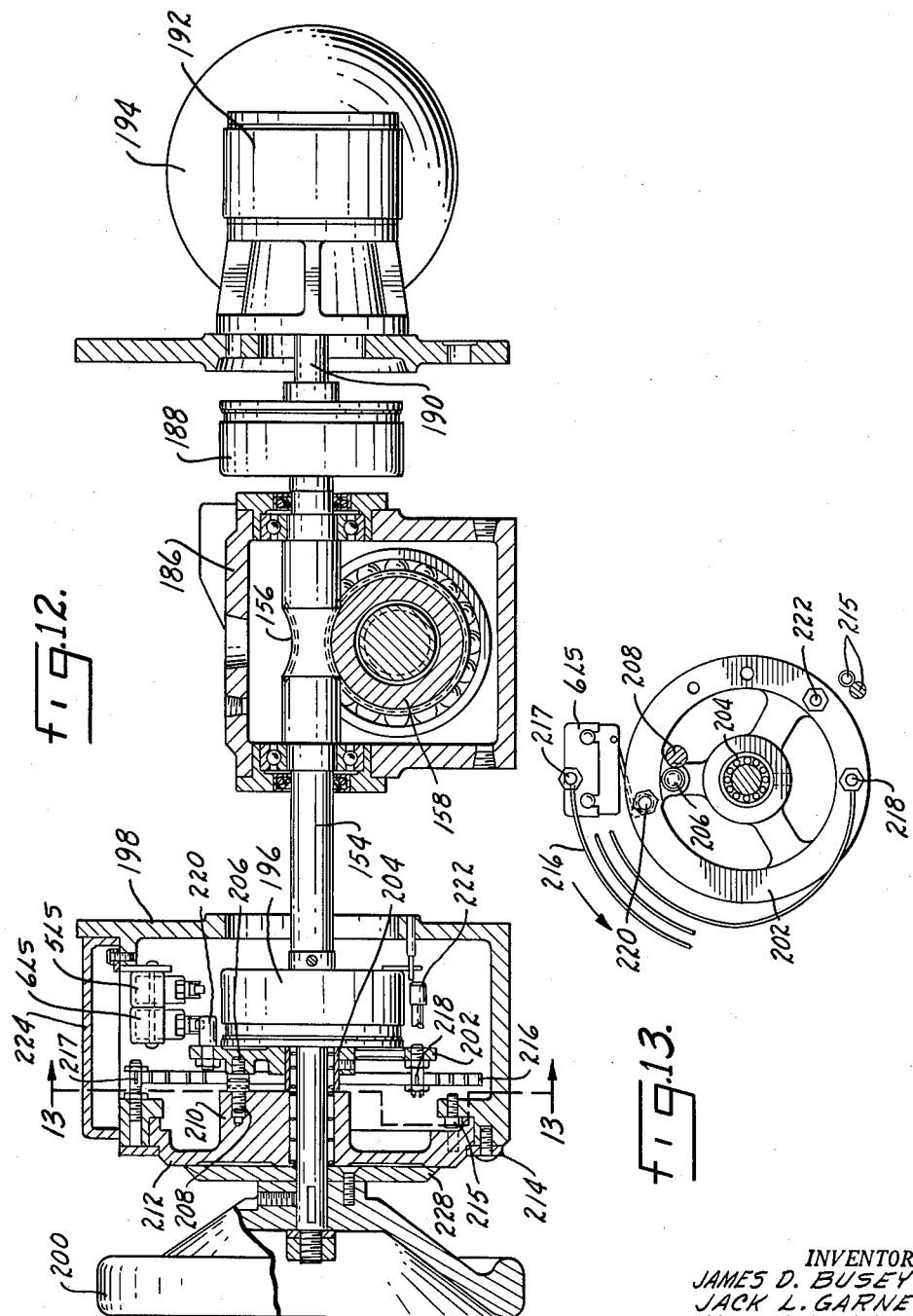

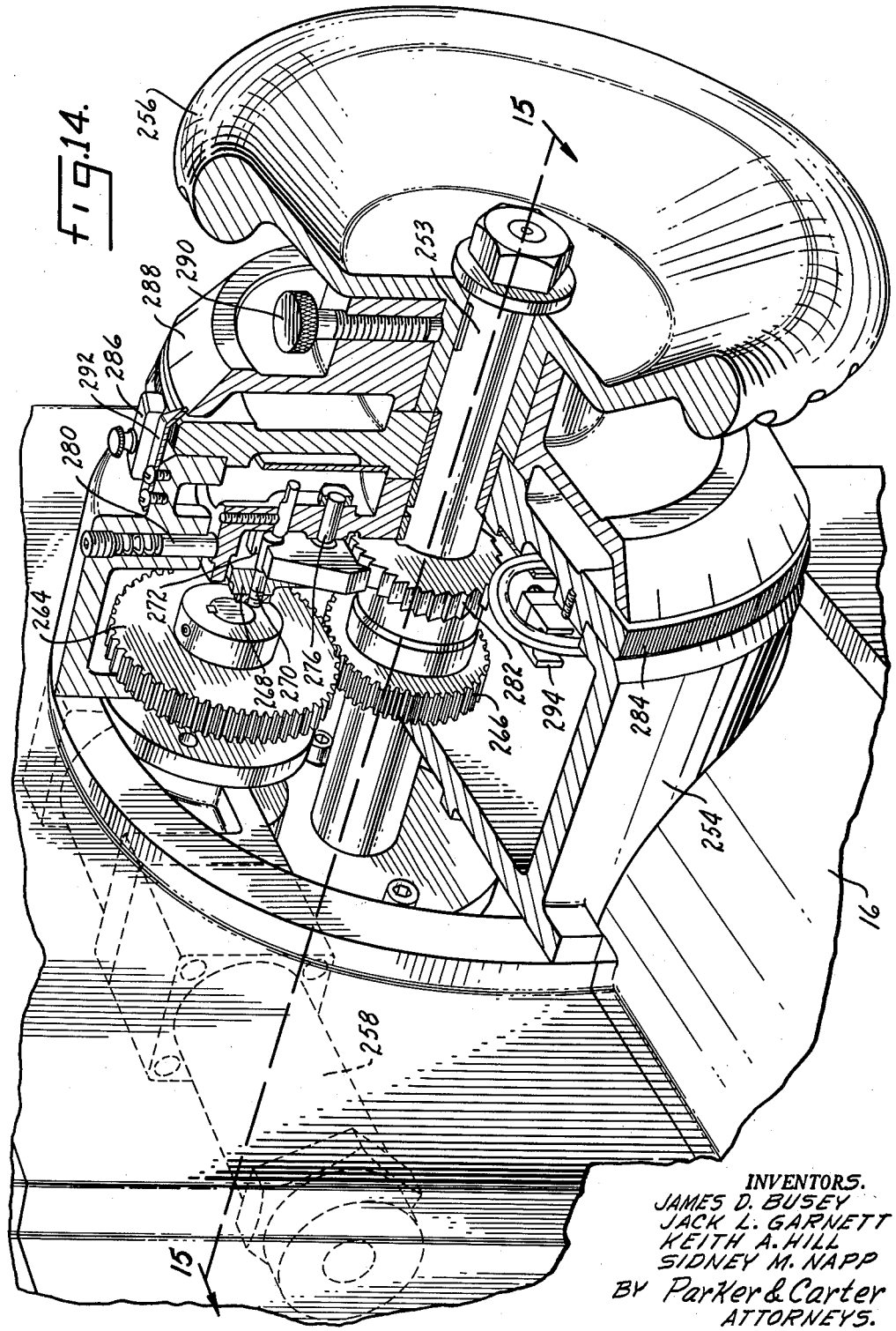

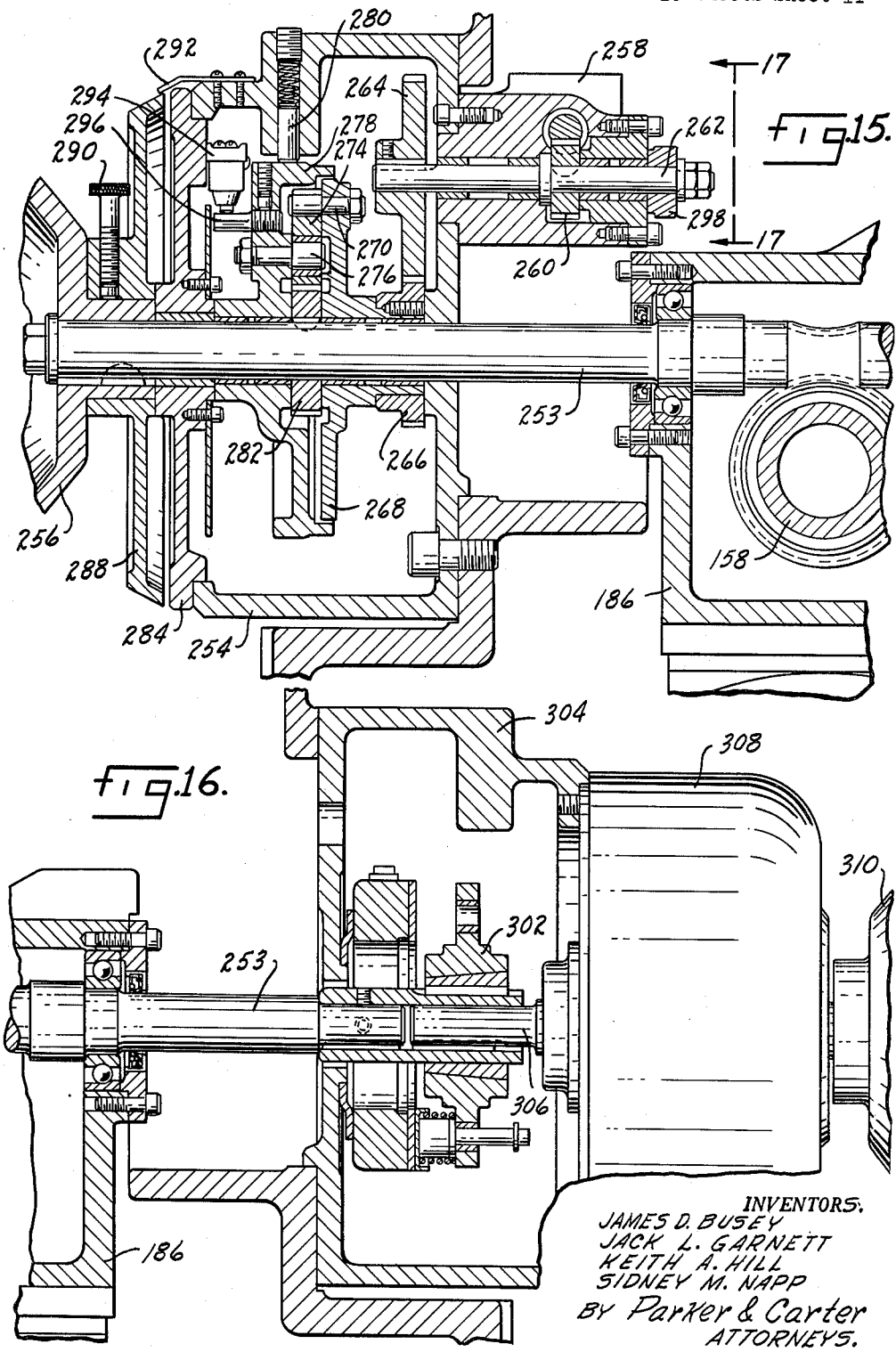

Nov. 13, 1962 J. D. BUSEY ETAL 3,063,203
GRINDER
Filed Aug. 27, 1959 15 Sheets-Sheet 12

INVENTORS.
JAMES D. BUSEY
JACK L. GARNETT
KEITH A. HILL
SIDNEY M. NAPP
BY Parker & Carter
ATTORNEYS.

INVENTORS.
JAMES D. BUSEY
JACK L. GARNETT
KEITH A. HILL
SIDNEY M. NAPP
BY Parker & Carter
ATTORNEYS.

Nov. 13, 1962     J. D. BUSEY ETAL     3,063,203
GRINDER
Filed Aug. 27, 1959     15 Sheets-Sheet 15

INVENTORS.
JAMES D. BUSEY
JACK L. GARNETT
KEITH A. HILL
SIDNEY M. NAPP
BY Parker & Carter
ATTORNEYS.

United States Patent Office 3,063,203
Patented Nov. 13, 1962

3,063,203
GRINDER
James D. Busey, South Beloit, Ill., Jack L. Garnett, Beloit, Wis., and Keith A. Hill and Sidney M. Napp, Rockton, Ill., assignors to Besly-Welles Corporation, South Beloit, Ill., a corporation of Illinois
Filed Aug. 27, 1959, Ser. No. 836,353
21 Claims. (Cl. 51—111)

This invention is in the field of grinders and is more specifically concerned with a so-called double disc grinder in which two grinding discs are disposed face-to-face opposite each other with their axes aligned or coaxial and a suitable power source is arranged to drive each with workpieces being moved or disposed between the discs.

A primary object of the invention is a double disc grinder with a high degree of accuracy.

Another object is a double disc grinder with no backlash in the disc feeding mechanism.

Another object is a double disc grinder in which the discs are closely spaced for grinding and are widely spaced for dressing.

Another object is a double disc grinder of the above type in which backlash is eliminated when the discs are in either grinding or dressing position.

Another object is a double disc grinder with each of the discs mounted on a slidable quill and having a piloting arrangement for the rear end of the quill to insure accurate alignment of the quill with a spline drive when the bearing pads are replaced.

Another object is a dressing procedure which insures maximum accuracy.

Another object is a mounting arrangement for each grinding head which insures accurate positioning of the grinding faces of the discs.

Another object is a double disc grinder having an alignment gauge for each grinding head so that the machine may be factory set and thereafter accurately adjusted and aligned in the field.

Another object is a double disc grinder which may be used for face grinding.

Another object is a face grinding arrangement for a double disc grinder which avoids inaccuracy due to backlash.

Another object is a coolant system for a double disc grinder.

Another object is a motor mounting arrangement for a double disc grinder to prevent motor vibrations from affecting the accuracy of the disc faces.

Another object is a feeding arrangement for the grinding discs of the double disc grinder that gives an infinite adjustment of feeds either for infeeding or dressing.

Another object is a feeding mechanism for a grinder of the above type that insures an accurate feed.

Another object is a dressing procedure for a double disc grinder which insures that the dressed grinding face will be brought back precisely to grinding position.

Other objects will appear from time to time in the ensuing specification and drawings in which:

FIGURE 1 is a perspective of the front of the machine;

FIGURE 2 is a perspective of the back of the machine;

FIGURE 3 is an end view of the right end of the machine of FIGURE 1;

FIGURE 5 is a section also taken along line 4—4 of FIGURE 3 but of the inner portion of the quill and grinding head;

FIGURE 6 is a section also taken along line 4—4 of FIGURE 3, but above the portion shown in FIGURES 4 and 5;

FIGURE 7 is a front perspective from the right side of the machine with parts broken away for clarity;

FIGURE 8 is a diagrammatic perspective of a grinding disc, quill, drive, quill cylinders and feed;

FIGURE 9 is a perspective of the feeding mechanism and face grinding mechanism;

FIGURE 10 is an end view of the face grinding mechanism;

FIGURE 11 is the front view of FIGURE 10;

FIGURE 12 is a section along line 12—12 of FIGURE 9;

FIGURE 13 is a secton along line 13—13 of FIGURE 12;

FIGURE 14 is a perspective, similar to FIGURE 9, of a modified form of feeding mechanism;

FIGURE 15 is a section along line 15—15 of FIGURE 14 showing the left half;

FIGURE 16 is a section along line 15—15 of FIGURE 14 showing the right half;

Figure 4:
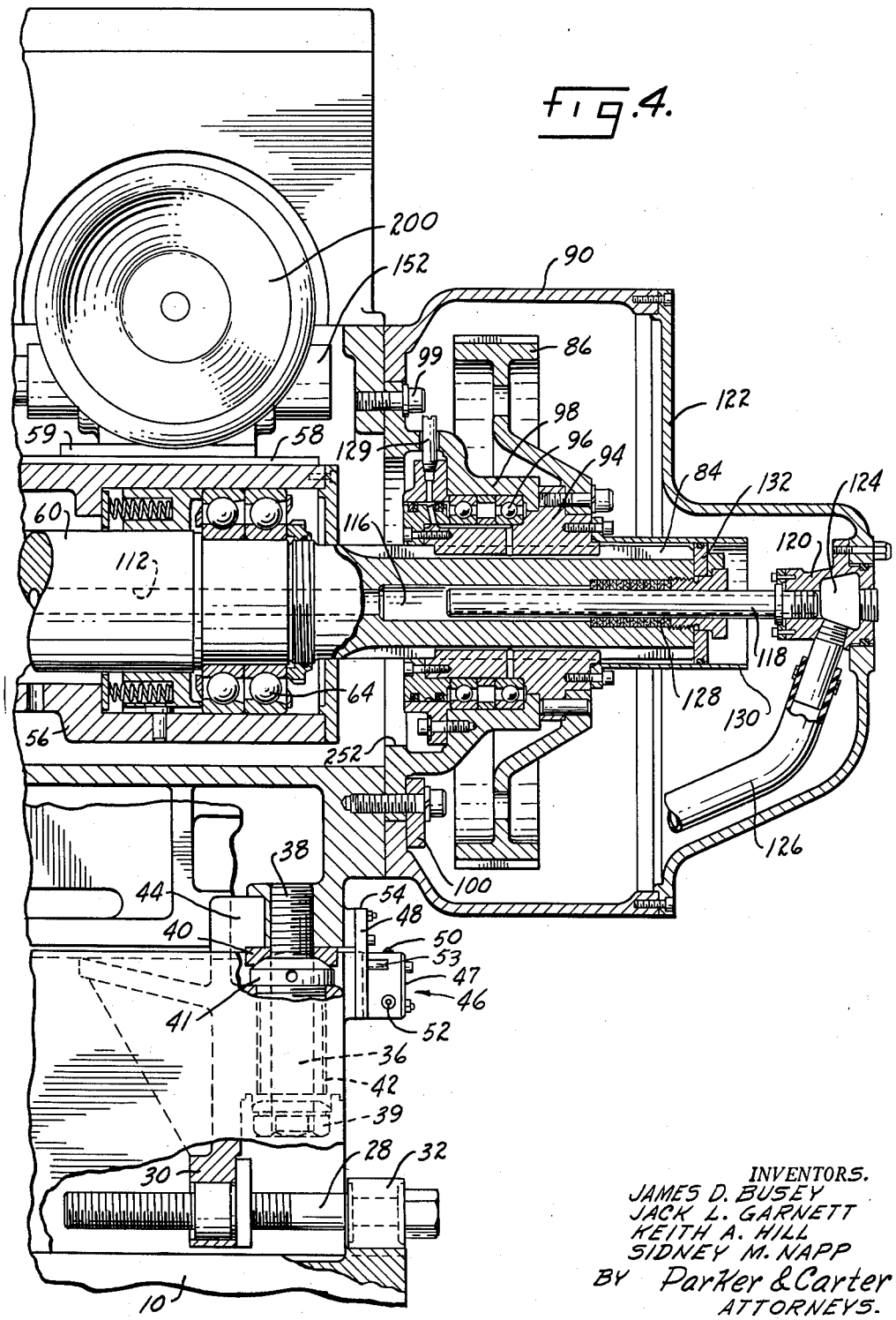
FIGURE 4 is a section taken along the line 4—4 of FIGURE 3, but on an enlarged scale, of the outer portion of the quill and coolant connection.

In FIGURES 1 and 2, the machine has been shown as including an elongated base 10 supporting a sub-base or sub-slide 12 on each side through a dovetail type connection 14 or the like. It should be understood that two such sub-slides are positioned on the base, one on each side, but the description hereinafter shall be confined to one. The other may be the same, except symmetrically reversed in certain respects. Each sub-slide carries a head or housing 16 which, by details set forth hereinafter, supports a grinding disc 18 shown in FIGURES 5 and 8. It will be understood that two such grinding discs are disposed axially and annularly opposite each other and workpieces to be ground are moved between the faces 20 of the discs. The disc faces 20 are accurately spaced so that the workpiece will be accurately ground to size. The machine may be used to grind any part or piece having parallel sides of approximately equal area. The workpieces might be, for example, piston rings, rotary pump parts, bearing races, ends of bearing rollers, or the like.

In FIGURES 1 and 2, the base has or supports a central hood 22 having a removable top cover 24 to provide for replacement of worn out grinding discs. The front of the machine may be provided with a suitable feeder for workpieces, indicated generally at 26, which may be attached to the front of the machine, as shown in FIGURE 1, as a part of the grinder or as a separate unit. The feeder may feed or convey workpieces into the front of the hood 22 and between the grinding discs. The one in FIGURE 1 is a rotary feeder in which the workpieces are carried in openings or slots in a rotary feeding plate. But a thru feeder might be used in which the workpieces are introduced through one side of the machine and discharged through the other. The present invention is not concerned with the details or type of feeder used so the feeder 26 should be taken as merely representative of any suitable unit.

Returning to the base and sub-slide, a screw or bolt 28 in FIGURES 1 and 4 may be threaded through a depending arm 30 on the sub-slide, the bolt being rotatably mounted in a pillow block 32 or the like on the base so that rotation of bolt 28 will feed the sub-slide either in or out to provide major adjustment of the over-all head assemblies and grinding units toward or from each other.

The upper surface of the sub-slide may be considered to be generally flat and the head is mounted thereon so that it may be moved from side to side to tilt the disc horizontally or up and down to tilt it vertically. This is to say that the head may be moved in a slight pivoting motion either vertically or horizontally or both. For example, for a vertical tilt the forward part of the head is mounted on the sub-slide with a tilt bar 34 or half round, in FIGURES 5 and 7, on each side. Each tilt bar is connected by a vertical stud and nut 35 or the like. A stud 36 in FIGURES 3 and 4 is mounted in the sub-slide and is threaded into the head at 38 and held at its opposite end to the sub-slide by a spherical washer and jam nut 39. In FIGURE 4, a vertical concave washer 40 bears against the spherical head 41 of a hollow stud 42 threaded into sub-slide 12, there being sufficient spacing between the sides of the stud 36 and the inside of stud 42 so that when the head tilts slightly, the stud may adjust itself and shift with the head. It will be noted that the head 41 of stud 42 has holes to accept a spanner wrench to cause the stud 42 to walk up and down in the sub-slide to raise or lower the outer end of the head.

For a horizontal tilt, the head is mounted on a universal ball and socket pivot, not shown, between tilt bars 34, the socket being mounted in the sub-slide, and the ball being connected to the head through a suitable rod. The head has horizontally disposed set screws 43 on each side, shown in FIGURE 7, opposite each other and engaging a block 44 projecting up from the sub-slide, in FIGURE 4, so that when one set screw is taken in and the other backed off, the outer end of the head will be moved either forward or backward thereby pivoting slightly about the ball and socket joint. The connection at the tilt bars 34 on each side is sufficiently oversize so that a slight horizontal tilt may take place when the nuts 35 are backed off.

When a double disc grinder of this type is made and shipped to a customer, it is initially preset at the factory after a certain run-in period and testing. A part of this setting involves accurately positioning each of the heads 16 on its sub-slide so that the faces of the grinding discs will lie in planes which are as parallel as possible. This involves raising or lowering the outer end of the head by the stud nut 42 to pivot the entire head assembly slightly about tilt bars 34. Once it has been determined that the grinding faces are precisely parallel and in the proper position, the head is secured. When the machine is shipped and installed in a customer's plant or factory, the head may be out of alignment due to handling during shipment. It is desirable to quickly bring the head back to the proper setting so that the faces of the grinding discs will be accurate and precisely parallel.

For this purpose gauging surfaces or brackets, indicated generally at 46 in FIGURES 4 and 7, are provided between the rear end of the head and sub-slide. These include a mounting 47 on the sub-slide and an L-shape or angle 48 on the head. The mounting 47 has adjustable buttons or points on each side thereof, one on top at 50 and the other on the side at 52. A post or pin 53 may be positioned on the angle 48 to establish a reference distance. The angle 48 has a top surface 54 and a side surface 55, each of which corresponds to one of the buttons. First the grinding faces are accurately paralleled by feeler gauges or the like. Then the dial indicator or the like may be held against the top surface 54, by a suitable mounting, if desired, and the distance to the pin or plug 53 sensed. The dial indicator may be zeroed against the plug. This establishes the reference on the dial indicator. Thereafter, the dial indicator may be held flush against the surfaces 54 and 55 on the angle and the feeler of the dial indicator held in contact with the buttons 50 and 52. Buttons 50 and 52 may be adjusted until the dial indicator is zeroed and the operator then knows that the gauging distances are accurate and the surfaces are at the reference distance from the buttons 50 and 52.

Thereafter, in the field the operator can again zero the dial indicator between surface 54 and plug 53 and then check the distance between surfaces 54 and 55 and buttons 50 and 52, respectively, to see if the machine has changed. To detect vertical tilt, the dial indicator would be held on surface 54 and the feeler or stem would touch the button 50. To detect horizontal tilt, the dial indicator would be held on surface 55 and the feeler would touch button 52. After the machine is checked and run in at the factory, the dial indicator would be "zeroed" on each tilt. Then when the machine has been shipped and fully installed at a customer's plant, the tilt of the head in either or both directions can be quickly and easily zeroed so that the grinding faces will be precisely parallel. If a tilt in either one or both directions is desirable, it can be quickly acquired by observing the amount of tilt on the dial indicator. This insures that all inaccuracies caused by shipment of the machine will be removed. Also, machines of this type get out of adjustment during use, and from time to time the owner or service man may recheck the relation of the gauging surfaces and readjust as needed. In short, this establishes an accurate adjustment of the machine and at any time after the readings are first taken, the machine can be easily and quickly checked and any adjustments made. There is a slight spacing between the angle or L-shaped bracket 48 and the mounting 47, as shown in FIGURE 3, to provide for slight movement. Also, the alignment surfaces are directly on the horizontal between the sub-slide and head and, therefore, in plane with the forward pivot.

It will also be noted that the nut 35 on each side at the forward mounting of the head would be loosened to provide for the adjustment of the head. Also, the head rests on a three point contact, the two tilt bars 34 at the forward end on each side and the adjusting stud 42 at the outer center. This three point support provides a firm mounting for the head, the two inner points of the support being on each side of the grinding disc axis with the outer point 42 being vertically aligned with the grinding disc axis, as shown in FIGURE 3.

The housing supports the grinding assembly which includes a quill 56 shown in cross section in FIGURES 4 and 5 and in perspective in FIGURE 8. The quill is constructed to slide in or out and is mounted on three inner pads 57 and three outer pads 58, the pads being disposed at approximately equal intervals around the quill and functioning as the bearings or supports for the quill and provide for its sliding movement. The pads slide on corresponding pads in the head, only the top housing pad, as at 59, being shown in FIGURES 4 and 5 since the section line of FIGURES 4 and 5 is taken between the bottom pads. A spindle 60 is supported on forward and rear bearings 62 and 64, having a wheel flange 66 to which is attached a plate 68 by bolts or the like, the grinding disc 18 being secured to the plate. The spindle is driven in a manner to be explained hereinafter.

The front of the spindle is sealed by a suitable flexible boot 70 or the like which is clamped at 72 to a suitable seal ring 74, the seal ring being screw threaded or otherwise held on the front of the quill 54. The seal ring 74 does not rotate and, and accordingly, the space 76 between the seal ring and the rotating wheel flange is a highly accurate tortuous passage which will prevent dirt and foreign matter from entering. The other end of the boot is held by a snap ring 77 or the like on a ring 78 connected to the head. The head may carry a hood ring 80 which is constructed to slide in and out in the hood 22 and may be provided with a seal 82.

As shown in FIGURE 4, the outer end of the spindle projects past the outer bearing 64 and is driven through a splined drive. For example, the outer portion of the spindle, shown in FIGURES 4 and 8, has a splined connection 84 with a driven pulley 86 which is driven by a suitable belt 88, and a cover or belt guard 90 around the pulley is mounted on the head. The pulley may be supported on a hub or sleeve 94 mounted to rotate through bearings 96 or the like on a support 98 connected to the outer end of the head inside of the guard 90. Note that bolts 99 pass through support 98 and one or more dogs 100 overlap the guard 90. Guard 90 is constructed to pivot on the flange of support 98 and, as shown in FIGURES 2 and 4, may be moved to accommodate itself to the position of the drive motor.

The belt 88 is driven by a suitable drive pulley 102 which is mounted on the drive shaft of an electric motor 104 or the like shown in FIGURES 2 and 3. It will be noted that the guard 90 extends around the belt and around both pulleys. The motor is mounted on a base 106 which is pivoted at 108 on the sub-slide in FIGURE 3. The lower end of the base is adjustably supported by bolts 110 or the like.

The motors for both spindles are mounted on the sub-slide and bear against the base 10. They are not on top of the heads, which was a common practice prior to this invention. The only connection between the motor and spindle is through the belts. Thus, the vibrations from the motors will not be transmitted directly to the discs. In the past, motor vibrations have been transmitted to the grinding discs resulting in substantial inaccuracies. Additionally, having the motors on top of the heads has been unsightly. The present arrangement avoids this since the motors are behind and below. Also, by adjustment of bolts 110, the base may be pivoted and the tension in the belt may be easily adjusted.

As stated hereinabove, the quills are constructed to be moved in and out by a mechanism to be explained in detail hereinbelow, and the spline connection 84 allows the quill and spindle to move axially without disturbing the drive.

The spindle is provided with a central or axial passage 112 for coolant which opens at 114, shown in FIGURE 5, to the grinding disc which may have holes or passages through it. As shown in FIGURES 4 and 5, this coolant passage extends all the way through the spindle and is somewhat enlarged at 116 toward the other end to accept a coolant tube 118 which, by a suitable mounting 120, is held on the outer cover plate 122. Coolant is supplied by a suitable coolant pump 123, in FIGURE 1, to a chamber 124 in FIGURE 4 in the mounting through a suitable hose connection 126. The coolant tube 118 has an outside diameter which is somewhat less than the inside diameter of the enlarged passage 116 in the spindle and a suitable packing or seal 128 is provided. A suitable connection 129 for supplying lubricant to the spline connection may extend through support 98. A shielding tube 130 may be mounted on the drive pulley 86 with the drive shaft sealed around it through a sealing disc 132, so that lubricant will not be thrown out the end of the spline connection inside of the belt cover or guard.

Coolant is supplied through hose 126 and then through the coolant tube 118. The coolant tube projects inside of the spindle and coolant will flow through the spindle to the grinding disc. The coolant tube is stationary while the spindle rotates and the packing or seal 128 provides both for rotary as well as longitudinal motion since the quill and spindle may be moved either in or out. The outer end of the spindle and coolant tube telescope sufficiently so that the tube will always open beyond the seal in all positions of the spindle.

An incremental feeding means for feeding the grinding disc inwardly toward grinding position is provided to compensate for wheel wear and is preferably in the form of an arrangement for feeding the quill. Since the quill carries the spindle and grinding disc, an infeed of the quill will feed the disc. In FIGURE 6, a spindle lug or bracket 134 may be secured on top of the quill and held by bolts 136 and a key 138, if desired, for accuracy. A feed screw 140 may be disposed through the lug and is held against rotation by a lock collar 142, keyed to the feed screw at 144, and with a bolt key 146 on the lower side thereof disposed in a keyway defined by two parallel bars 148 mounted on top of the lower flange 150 of the lug.

A housing 152 surrounds the other end of the feed screw and carries a cross shaft 154 which, through a worm gear 156, rotates a nut 158 which surrounds a portion of the feed screw. The screw and nut may be provided with a ball screw and race assembly 160 of a conventional type so that rotation of the nut will cause the feed screw to move. The nut may be suitably sealed on either side of the cross shaft by seals 162 and 164 to exclude foreign matter.

The feed screw has a push collar 166 held in place by a set screw or the like bearing against a shoulder 167 on the feed screw. This push collar is spaced, as shown in FIGURE 6, from an endplate 168 on the lug. A spacer block 170 is disposed between these two and may be horseshoe or U-shaped, and upside down, so that it fits over the feed screw and is constructed to abut the collar 166 and end plate 168. The spacer block is carried by the piston rod 172 of an air cylinder 174 mounted on lug 134. The air cylinder is constructed to insert the spacer block between the collar and end plate or to withdraw it. A collar 176, similar to collar 166, is disposed on the feed screw on the other side of the lug or bracket 134.

As shown in FIGURES 7 and 8, quill cylinders 178, which may be pneumatically operated, are mounted on each side of the quill. The piston rod of each is connected at 180 to the quill and the other end of the cylinder is connected at 182 to the head or housing 16. One of the cylinders is disposed on each side of the quill, as shown in FIGURE 8, and disposed in the same horizontal plane with the spindle axis to eliminate unnecessary bending moments and providing a direct thrust right on the quill center line.

Figure 18:
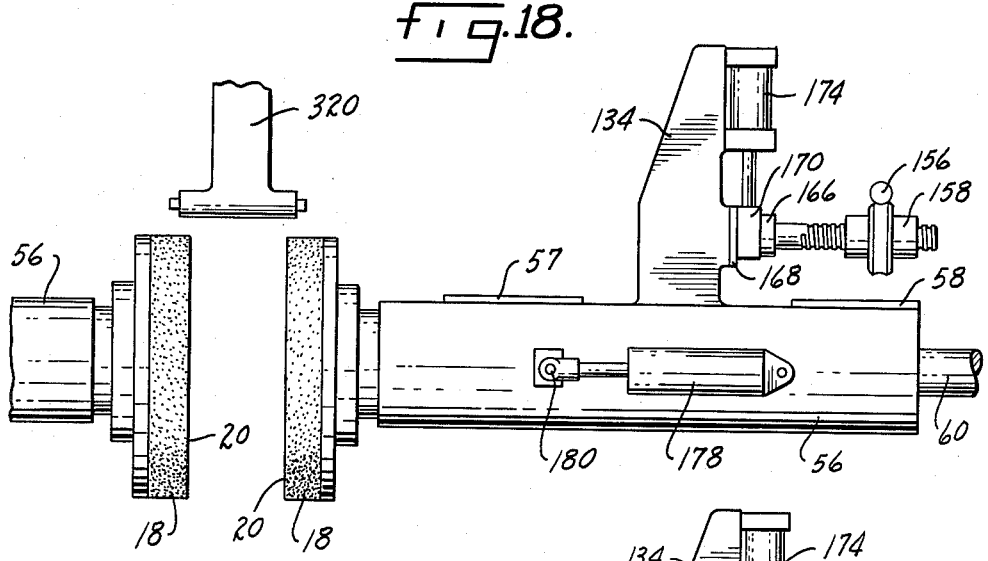
FIGURE 18 is a diagrammatic showing of the discs in grinding position.

The cylinders may be used to move the quill one way or the other in the housing and perform several functions. For example, the grinding discs may be moved inwardly toward each other to grinding position where they are closely spaced, or they may be moved outwardly away from each other to dressing position. This might be referred to as a rapid traversing movement. The mechanism is shown with the grinding disc in grinding position in FIGURES 6 and 8. But when a dressing operation is started, the machine is arranged so that, first, cylinder 174 raises spaced block 170 to the broken line position of FIGURE 6. Then pressure is supplied to the quill cylinders 178 to withdraw the quill. This action is shown schematically in FIGURES 18 and 19. The lug 134 slides over or along the feed screw until end plate 168 hits the collar 166, it being understood that the feed screw passes freely through lug 134. But, at the same time, the feed screw may not be rotated and, in fact, cannot rotate since the keyway defined by blocks 148 is long enough to hold the key bolt 146 in either grinding or dressing position. After a dressing operation, the air pressure is reversed in the quill cylinders and the quill and lug move to the left from the FIGURE 19 position until the other end plate 184 on the lug strikes the locking collar 176. Then, air cylinder 174 is actuated to lower spacer block 170 between locking collar 166 and end plate 168. Thus, the spacer block 170 defines the travel of the grinding disc between grinding and dressing positions and in this sense the opposite sides of this block should be accurately finished.

The cross shaft 154 which moves the feed screw through the rotating nut is shown in detail in FIGURES 9 and 12 and is partially enclosed in a gear housing 186 but projects on both sides thereof. The rear end of the shaft may be provided with a clutch coupling 188 connected to a stub shaft 190 running through a speed reducer 192 to a suitable ratio motor 194 mounted or otherwise disposed in the back or rear of the head. The front end of the cross shaft may be connected to a second or front clutch coupling 196 which is disposed in a suitable clutch housing 198 mounted, as shown in FIGURE 9, on the front of the head. In this case, the cross shaft extends through the front clutch coupling and is connected on its outer end to a suitable hand wheel 200 or the like which, as shown in FIGURES 1 and 7, may be suitably disposed on the front of the machine where it may be easily turned by the operator.

A disc 202 is mounted in the clutch housing 198 on the cross shaft and is carried by a suitable hub 204 which rotates on the cross shaft and also carries a part of the clutch coupling. The disc carries a bumper screw 206 which abuts or hits a back-off screw 208 carried by a plate 210 which extends through the front of the clutch housing and has a suitable dial 212 which is releasably held in position by a clamp ring 214 in FIGURE 12. When the clamp ring is backed off, the plate may be rotated, which will variably position the back-off screw 208. Plate 210 is limited to slightly less than 360° rotation by abutting screws 215. A return or clock spring 216 is connected to the plate at 217 and to the disc at 218, always tending to rotate the disc in one direction. The disc carries two pins, a short one 220 and a long one 222. Two readily accessible microswitches 6LS and 5LS are mounted in the clutch housing under a removable cover 224 to be contacted by the pins when the disc 202 is rotated. It will be noted that the short pin 220 will only contact microswitch 6LS and the long pin 222, due to its enlarged head and reduced shank, will only contact the other microswitch 5LS. The amount of manual infeed may be observed on a suitably graduated indicator plate 228.

The operation of this structure is as follows: The ratio motor 194 on the back drives the cross shaft 154 through the clutch coupling 188. When the coupling is energized, the cross shaft will rotate the nut 158 which in turn moves the feed screw toward grinding position. At the same time, the front clutch coupling 196 is energized. This serves to rotate disc 202 which carries the pins around to contact microswitches 6LS and 5LS. When the pins contact the microswitches, the clutches will be deenergized and released and the feeding movement, either for feed or for dressing, will be completed. As soon as clutch 196 lets go, the disc 202 will return or be rewound by clock spring 216 until bumper screw 206 hits back off screw 208. The position of the back off screw may be changed by releasing shoe 214 and rotating dial 212. This will vary the length or distance of a feed, be it for feeding or dressing. This precise operation will be correlated to the rest of the operation or function of the machine hereinafter.

The schematic showing in FIGURE 8 has the hand wheel and clutch housing on the back rather than in front, but it might be either.

A modified form for face grinding has been shown in FIGURES 9 through 11. This may take the form of a face grinding attachment, and the basic parts or elements previously referred to shall have the same numbers. A suitable support 229 is mounted on the end of the feed screw 140. Comparing this to the form shown in FIGURE 6, the locking collar 142 has been removed and the support slipped over the forward end of the feed screw 140. The support is shown in FIGURE 11 with two legs 230 coming down to trunnions 232 which surround the feed screw but are not keyed to it. In short, the feed screw may rotate within the trunnions. The support carries an air cylinder 234 with a piston rod 236 projecting below it and connected by a hinge connection 238 to one arm of a rocker 240. It will be noted that the air cylinder 234 is pivoted at 242 on the support for slight pivotal movement to conform to the movement of the rocker 240. The rocker surrounds the feed screw and is keyed to it at 244 so that oscillation of the rocker oscillates the feed screw. The other arm of the rocker has a button 246 which engages a set screw 248 on the back of the support 229 at one end of its rocking motion. The inner trunnion 232 of the support has a key bolt 250 which corresponds somewhat to the key bolt 146 described in connection with FIGURE 6, the key bolt 250 fitting in the keyway defined by bars 148.

When the grinding discs are closely spaced in grinding position, the cylinder 234 may be energized to oscillate the rocker. Since the rocker is keyed to the feed screw, this rotates the feed screw. Since the unit is now stationary, the feed screw feeds in and out as it is oscillated and no change takes place in the hand wheel or compensator. This tends to move the quill in and out slightly and the grinding discs will also reciprocate.

The bearing pads supporting the quill have a tendency to become worn in use and require replacement. Alignment is a problem. The inner bearing pads at 57 in FIGURE 5 are not critical, but the outer pads 58 must be highly accurate due to the presence of the spline connection 84 to the drive just behind it. Pilot surfaces 252 on the drive housing 90 receive the outer end of the quill and accurately position it, insuring that the bearing pads are properly installed. Thus, the quill may be realigned with a high degree of accuracy.

In FIGURES 14 through 17, a variant form of infeed has been shown in which the cross shaft 253 extends forward through a housing 254 with a hand wheel 256 mounted on its outer end. An air cylinder 258 or the like is mounted on the inner wall of housing 254 with the piston of the air cylinder having rack teeth formed thereon in mesh with a pinnion or gear 260 mounted on and keyed to a jack shaft 262 which extends forward inside of the ratchet housing and carries a gear 264 in mesh with a gear 266 rotatably supported on the cross shaft. Gear 266 is connected to a ratchet plate 268, also rotatably supported on the cross shaft, and carries a pin 270 that projects into a slot 272 in the top of a dog 274 pivoted at 276 on an index plate 278 which is dampened by a drag pin 280 and rotatably supported on cross shaft 156. The dog opposes a ratchet wheel 282 which is keyed to the cross shaft. An index plate 284 closes the front of the housing and is held by a releasable shoe 286 and has a knurled exterior, shown in FIGURE 14, and is supported by the cross shaft. A dial 288 is held on the hub of the hand wheel by a thumb screw 290 and is suitably graduated so that the amount of feed may be checked on a pointer 292 mounted on the ratchet housing. The feed plate 284 carries a microswitch 294 which is disposed to be engaged by a pin 296 carried on the index plate 278.

Figure 17:
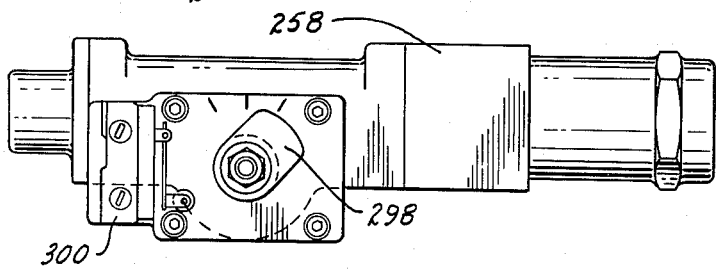
FIGURE 17 is a view taken along line 17—17 of FIGURE 15.

As shown in FIGURE 17, the jack shaft 262 carries a cam 298 which is adapted to engage a microswitch 300 to determine dressing feed.

The rear end of the cross shaft is connected through a brake 302 in a brake housing 304 to a stub shaft 306 which is driven by an air gap motor 308 with a hand wheel 310 on the back.

The operation of this structure is as follows: Air motor 258 rotates shaft 253 when a feeding movement is ordered, either for a normal infeed to compensate for wheel wear or a dressing infeed. This rotates the ratchet plate 268 and pin 270 pivots dog 274 until its nose catches in one of the teeth of the ratchet. In effect, the dog picks up the ratchet which, since it is keyed to the cross shaft, rotates the cross shaft thereby effecting an infeed. When pin 296 contacts microswitch 294, air motor 258 is reversed which ends the infeed and also recocks the feeding mechanism. The back stroke of the air motor first counter rotates dog 274 until its nose comes out of the ratchet teeth and the ratchet plate 268 and disc 278 counter rotate until the air motor stroke is finished. During this counter rotation, the ratchet 282 and cross shaft are not affected, since the dog does not engage the ratchet. As soon as an infeed starts, the drag 280 will momentarily prevent the index plate 278 from moving until the dog is tilted and its nose is in one of the teeth of the ratchet. When return movement starts, drag 280 again momentarily holds the index plate until the nose of the dog has been pivoted out of the ratchet teeth. During such counter rotation the dog strikes a stop, not shown, on the ratchet plate when its nose has been lifted and is clear of the ratchet teeth.

This has the advantage that the cross shaft may be manually rotated by the front hand wheel 256 at all times. Additionally, the length of an infeed to compensate for wheel wear may be adjusted by releasing the setting plate 284 and rotating it to change the position of microswitch 294.

The brake 302 prevents the feed from overrunning. For example, when the discs are moved out to dressing position, momentum might carry them past, but the brake will stop them accurately. The air gap motor 308 drives the cross shaft for either in or out feeds.

Figure 20:
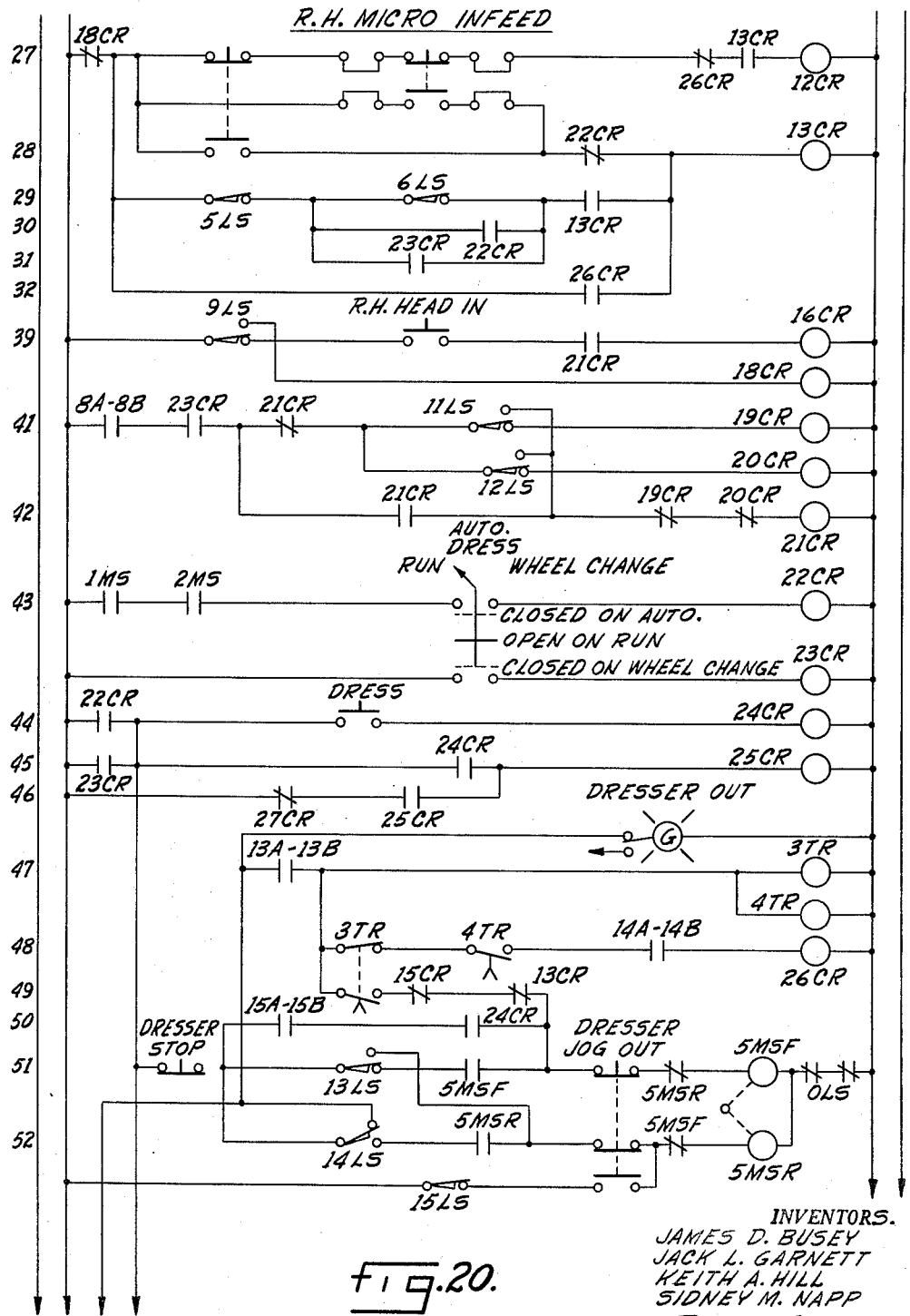
FIGURES 20, 21 and 22 are a wiring diagram.
Figure 21:
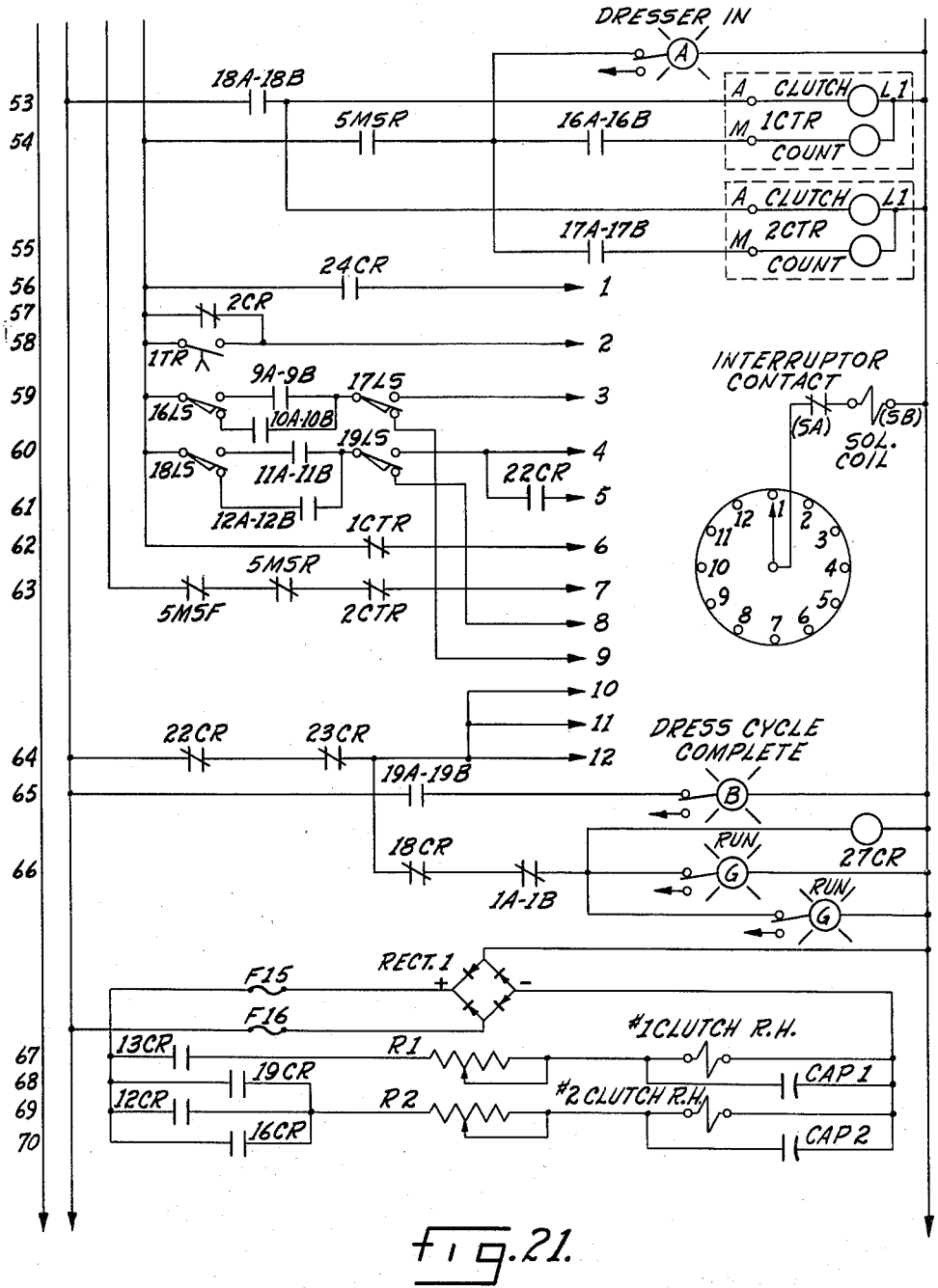
Figure 22:
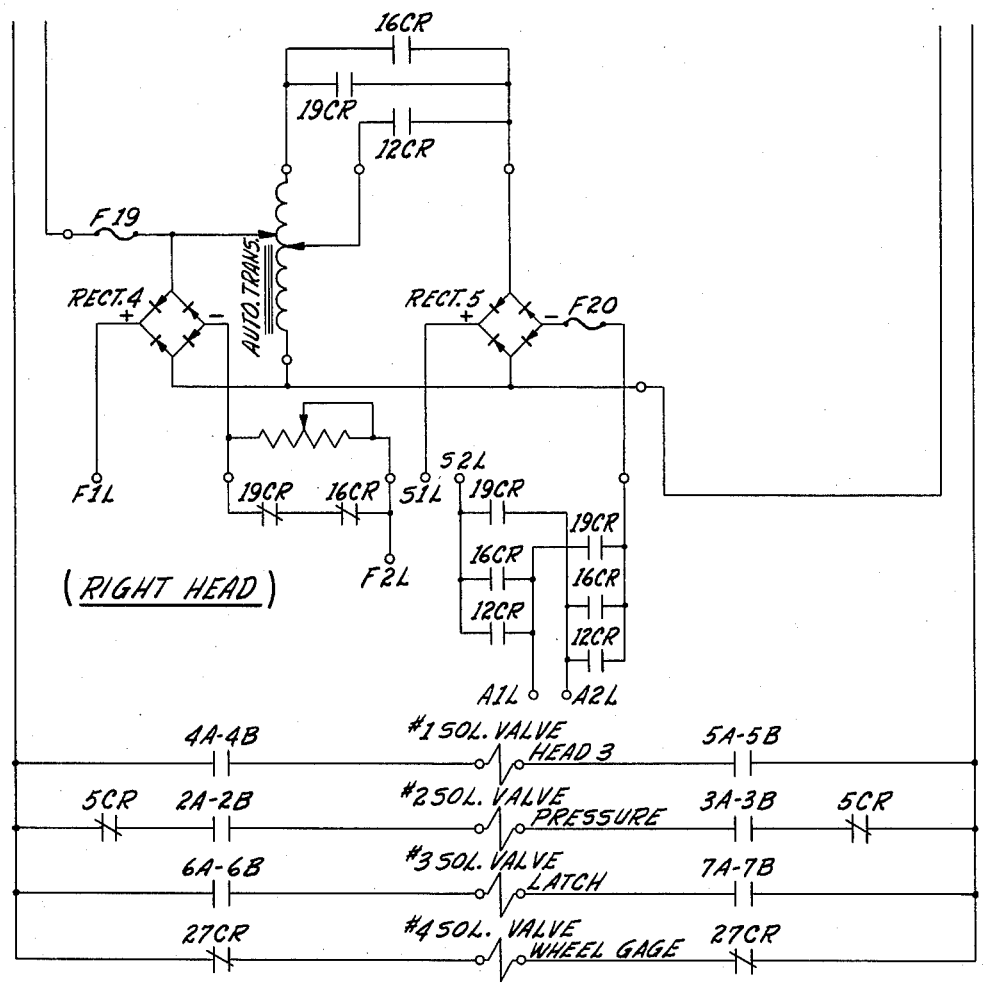

The structure will now be coordinated with the wiring diagram in FIGURES 20, 21 and 22. The description will be limited to the right head of the machine, but it will be understood that the left head is the same. The description will be related to the clutch infeed mechanism of FIGURE 9. The basic components consist of the D.C. ratio motor 194, the current being supplied by proper rectifiers and a transformer, not shown, with field and armature controls arranged to provide both a slow and a fast r.p.m. of the motor. The motor operates in connection with the clutches, clutch 188 connecting the motor shaft to the cross or worm shaft 154 and clutch 196 bringing in the disc 202 which carries trip pins 220 and 222 for the microswitches.

For a normal micro infeed, the operator depresses the R.H. microfeed button, located on the control panel 312. This energizes relay 13CR (line 28 on the wiring diagram, FIGURES 20, 21 and 22). This energizes clutch 196. The operator releases the microfeed button which energizes relay 12CR (line 27). This engages clutch 188 and starts motor 194, thus revolving the cross shaft 154 and disc 202. Trip pin 220 trips limit switch 6LS releasing both clutches and stopping the ratio motor. Disc 202 is then free to return to its original position, by clock spring 216, until the back-off and bumper screws contact.

For an automatic dressing operation, the selector switch is turned to automatic, "Auto," energizing relay 22CR (line 43). Contacts 22CR (line 44) close making the "Dress" button (line 44) effective. The operator then depresses the "Dress" button which is located on the control panel 312. This momentarily energizes relay 24CR. Contacts 24CR (line 56) close causing the step switch (lines 56—64) to move to position No. 2. Contacts 2A—2B (line 93) close energizing the solenoid valve which switches air pressure to the high side for the quill cylinders 178. Since the step switch is in position No. 2, contacts 2CR (line 57) are closed and the step switch moves to position No. 3. Contacts 4A—4B (line 92) close reversing the pressure in the quill cylinders so that the quills are biased inwardly and the spacer block 170 is not held tightly between end plate 168 and collar 166. Contacts 6A—6B (line 94) close thereby reversing the air pressure in cylinder 174 causing the spacer block to rise. When the spacer block is up, limit switches 16LS and 17LS (line 59), one for each head, close and since contacts 9A—9B (line 59) are now closed, the step switch moves to position No. 4.

Contacts 4A—4B (line 92) open in this position of the step switch reversing the pressure in the quill cylinders. Since the quills are not now held by the spacer block, they move back to dressing position, shown in FIGURE 19, where end plate 168 contacts collar 166. When the limit switches 18LS and 19LS (line 60), one for each head, are closed and since contacts 11A—11B (line 60) are now closed, the step switch moves to position No. 6. Contacts 13A—13B (line 47) close energizing timers 3TR and 4TR (line 48).

Timer 4TR contacts close energizing relay 26CR (line 48). Contacts 14A—14B are closed. Contacts 26CR (line 32) close momentarily. Timer 3TR times out dropping relay 26CR. The momentary closing of contacts 26CR energizes relay 13CR and 12CR (lines 27 and 28) for a dressing infeed. Contacts 22CR (line 30) are now closed shorting out limit switch 6LS (line 29), so trip pin 220 on disc 202 moves past microswitch 6LS until microswitch 5LS (line 29) is tripped by trip pin 222. This drops out the dressing infeed and disc 202 rewinds. Contacts 15CR and 12CR (line 49) are now closed and since contacts 3TR are also closed, the dresser motor starter 5MSF (line 51) is energized starting the dresser arm moving between the abrasive discs.

As the arm leaves its "out" position, limit switch 14LS (line 52) trips to its opposite position. Meanwhile, the clutch coils on counters 1CTR and 2CTR (lines 53—55) are energized by contacts 18A—18B (line 53) which are closed in position No. 6 of the step switch. Contacts 1CTR (line 62) are open.

The dresser arm swings in until the diamonds are in the center opening in the grinding disc. When the arm reaches this "in" position, limit switch 13LS (line 51) is tripped, dropping out the dresser motor starter 5MSF and energizing 5MSR (line 52), reversing the dresser motor contacts 5MSR (line 52) and since contacts 16A—16B (line 54) are closed, the count coil in counter 1CTR (line 53) is energized. It should be noted that the count is not registered until contacts 5MSR open when the arm is "out." When the arm is out, limit switch 14LS (line 52) is again tripped to reverse its position thereby energizing the feed circuit for the dresser arm and the cycle repeats.

This continues until counter 1CTR counts out. The count out causes contacts 1CTR (lne 62) to close, and the step switch moves to position No. 7. Contacts 16A—16B (line 54) open and contacts 17A—17B (line 55) close. Contacts 14A—14B (line 48) also open thereby dropping out the dresser feed circuit. The dresser arm makes a number of passes without any infeed until counter 2CTR (line 55) counts out. Contacts 2CTR (line 63) close at the end of the count out, moving the step switch to position No. 8. Contacts 4A—4B (line 92) and 5A—5B (line 92) close energizing #1 solenoid valve which reverses the air to the quill cylinders and the head moves in.

When the head is in, limit switches 18LS—19LS (line 60) are tripped and since contacts 12A—12B (line 61) are closed in this position, the step switch moves to position No. 9. Contacts 6A—6B (line 94) open deenergizing the solenoid valve and the spacer block 170 moves down. When the "down" limit switches 16LS—17LS (line 59) close, moving the step switch to position No. 12, contacts 4A—4B (line 92) open thereby deenergizing the solenoid and reversing the air in the quill cylinders and the heads move back against the spacer block. Contacts 19A—19B (line 65) close and the dress cycle completion pilot light (line 65) comes on indicating that the dress cycle is finished. This pilot light is located on the control panel 312. The operator then turns the selector switch to the "run" position dropping out relay 22CR (line 43) and contacts 22CR (line 64) close moving the step limit switch back to position No. 1. The "run" pilot light on control panel 312 comes on (line 66).

For a wheel change, the operator turns the selector switch on the control panel 312 to "Wheel Change" (line 43) energizing relay 23CR. Contacts 23CR (line 45) close which makes the "Dress" button active. The "Dress" button is then depressed energizing relay 24CR (line 44). The quills move back to the automatic dress position in the manner described hereinabove, but since contacts 22CR (line 61) are now open, the step switch stops on position No. 5. Contacts 8A—8B (line 41) close energizing relays 18CR—19CR (line 41). This starts the D.C. motors in high speed r.p.m. in reverse and moves the quills back until limit switches 11LS—12LS (line 41)

are tripped. Contacts 20CR—21CR (line 42) are now closed and the quills may be moved in as required by "in" push buttons on the control panel. Contacts 15A—15B (line 50) are now closed and pressing the "Dress" button closes contacts 24CR (line 50) starting the dresser motor. The dresser arm makes one stroke in and then back and stops. This is repeated as required by pressing the "Dress" button. After adequate dressing the selector switch is then turned to "Auto." Contacts 22CR (line 61) close and the step switch moves to position No. 6. The automatic dressing cycle then takes place as described hereinabove.

There are additional features which have not yet been mentioned, but it is believed that these will best fall into place in a description of the operation of the overall machine.

The use, operation and function of the invention are as follows:

A double disc grinder is provided in which the grinding faces are opposite each other and are in planes which are precisely parallel. The discs may be brought close together in what has been referred to as grinding position or they may be separated to dressing position. An incremental feeding arrangement is provided to feed the discs incrementally inwardly to compensate for wear of the faces. Also, a rapid traversing is provided to move the discs rapidly back and forth between grinding and dressing positions.

The incremental feeding mechanism is probably best shown in FIGURE 6 and includes a nut and feed screw. The feed screw is connected to the quill which supports the grinding disc. The nut is constructed to be rotated by a feed arrangement and rotation of the nut moves the feed screw and the grinding disc.

When the grinding discs are in grinding position, the spacer block 170 will be down so that it is between collar 166 and end plate 168. In this position, air is supplied to the quill cylinders 178 tending to draw the quill out or away from grinding position. This thrust passes from the quill, through lug 134, through the spacer block 170 and collar 166 to the feed screw, then to the nut 158 and finally to the support 152 which is rigidly connected to the head 16.

This outward bias or thrust of the quill cylinders while grinding is going on will eliminate all backlash or looseness in the incremental feeding means. The effect is that the disc faces cannot move out any more and there will be no play or backlash to cause error or inaccuracy in the resulting workpiece.

Figure 19:
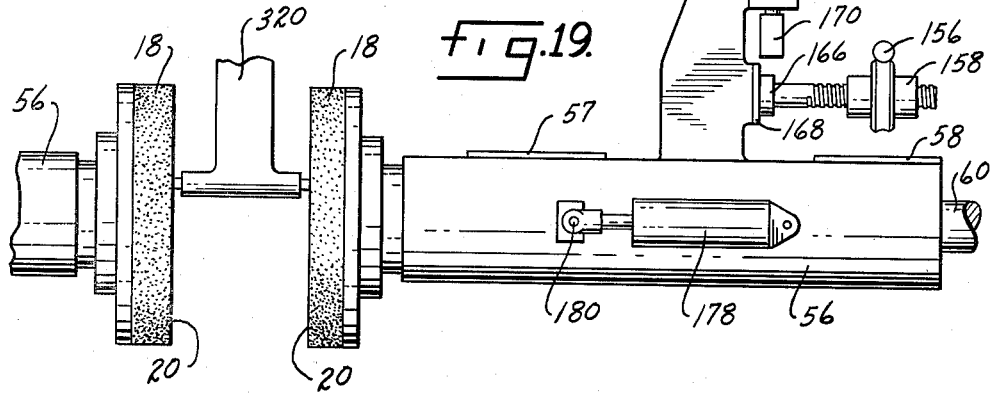
FIGURE 19 is a diagrammatic showing of the discs in dressing position.

When the operator wants to dress the discs, he depresses a suitable button on a control panel 312, shown in FIGURE 1, on the front of the machine. First, the air in the quill cylinders reverses so the thrust is inward. This loosens the incremental feeding means and cylinder 174 may easily raise spacer block 170. As soon as the block is fully up, the quill cylinders reverse again. The outward thrust of the cylinders quickly moves the quill out to dressing position at which point end plate 168 will engage collar 166, spacer block 170 being up out of the way. At the same time, a pin 314 carried on lug 134 contacts microswitch 12LS carried on the support 152 by a suitable bracket 318 or the like. The dresser 320 is then traversed, as shown in FIGURE 19, between the grinding faces. The dresser may be of the type having oppositely disposed diamonds spaced a predetermined distance apart.

When the discs are in dressing position, the quill cylinders also apply an outward thrust to the quills. Since end plate 168 will be flush against collar 166, the spacer block having been removed, all backlash or thread clearance in the feeding means will be eliminated. Thus, the dress off of the disc faces will be highly accurate.

It should be noted that the feeding means is energized when the disc gets out to dressing position so that the disc will be fed in an incremental amount prior to the dresser being passed across it to insure that a certain amount of the disc face will be dressed off. In short, the grinding discs are moved out to dressing position, then the incremental feeding means feeds the quill in an incremental amount against the bias or thrust of the quill cylinders and the dresser passes between the discs to remove a certain amount of the disc face. During the passage of the dresser 320 the quill cylinders are applying their outward thrust to the quill so that all backlash and thread clearance is removed. The advantage of the infeed just prior to dressing is that a smooth, uniform amount will be removed from the face under conditions of no backlash, as compared to dressing first and infeeding second. The feeding compensators feed the discs in under conditions of no backlash just prior to dressing. Thereafter, the discs are dressed which reconditions the abrasives. The face of each disc is in a plane which is exactly compensated for the amount dressed from the wheels. This automatically compensates for the dressing operation. Thereafter, the disc faces are returned precisely to their respective grinding planes where they are again in a no backlash condition.

The machine is initially preset for a certain amount of infeed whenever the feeding mechanism is energized. The amount of infeed should be within the permissible tolerances desired for any particular workpiece. For example, assume that the permissible tolerance is .002 of an inch. The infeed mechanism should be set so that the infeed will be on the order of .0015 of an inch. In the FIGURE 12 form, this may be done by rotating plate 210 which changes the position of back-off screw 208. The starting position of the disc 202 for an infeed, be it a normal infeed or for dressing, is as shown in FIGURE 13, with the bumper screw 206 in contact with back-off screw 208. The clock spring will always bring the disc back to this position when the clutch coupling 196 releases the disc. When an infeed is initiated, for either dressing or a normal infeed, the two clutch couplings 196 and 188 will engage. Thus, the ratio motor 194 will rotate the cross shaft 154. This rotates the nut and moves the feed screw 140 in. At the same time, the clutch coupling 196 rotates the disc 202 counterclockwise in FIGURE 13. As soon as the short pin 220 contacts its microswitch 6LS, for a normal infeed, the two clutch couplings 188 and 196 will be deenergized and the infeed will stop. At the same time, disc 202 will be released and the spring will return it until the back-off screw and bumper screw engage, which is starting position.

For a dressing operation, clutch couplings 188 and 196 will close and cause an infeed motion of the feed nut. Disc 202 will be rotated but the first microswitch 6LS will not be energized. Thus, its pin will have no effect. The disc will continue to rotate until the longer pin 222 contacts its microswitch 5LS. This will deenergize the clutch couplings to stop the feeding motion and also to release the disc 202 so it may return to starting position. The normal infeed control which involves pin 220 and microswitch 6LS may be controlled, for example, by a sizing mechanism.

The amount of infeed in any case is determined by the distance of the pins from the microswitches. Since the pins are on disc 202, they may be adjusted back and forth so the length of infeed for either a normal infeed or for dressing may be infinitely varied. Plate 214 is preferably graduated and is provided with a pointer, as shown in FIGURE 7, so that the amount of adjustment may be accurately determined.

In adjusting the mechanism for normal infeed, the spacing between small pin 220 and its microswitch 6LS when clutch coupling 196 is disengaged and bumper screw 206 is in contact with back-off screw 208 should be set for an infeed of a distance within the desired tolerance for the particular workpiece involved. Thus, when the sizing arrangement senses that the disc faces have worn away to a point outside the desired tolerance, the infeed may be actuated to feed the discs in by a distance which is less than the desired tolerance. This will bring the faces back to a distance within the desired tolerance and grinding may continue without interruption. But this infeed, to compensate for wheel wear, takes place against the outward thrust of the quill cylinders and there will be no backlash in the feeding mechanism.

The face grinding attachment in FIGURES 9, 10 and 11 is constructed to oscillate the feed screw when the grinding disc is in grinding position. This serves to move the disc in and out. But during dressing or otherwise, the face grinding attachment does not function. It might be energized by a suitable button on the control panel 312. The feed screw supports the entire attachment.

Lug 134 may carry microswitch 9LS on its side, shown in FIGURES 9, 10 and 11, which is operated by a pin 324 on locking collar 142, if the face grinding attachment is not used, or by a pin 326 on the outer trunnion of the face grinding attachment in FIGURE 11. This pin actuates the microswitch when the quill moves to grinding position or the microswitch may be actuated by an eye bolt 328 on collar 166 when the quill moves out to dressing position.

The lug 134 on the quill in FIGURE 6 may carry a pointer 330 which is visible through a window or opening 332 in the head, in FIGURES 5 and 7, which with a scale 334 indicates disc wear. The scale may be adjustably mounted so that after a new grinding disc has been installed and initially dressed off, the scale can be set at any appropriate graduation, for example 2 inches for a 2 inch disc or 3 inches for a 3 inch disc, to show the operator how much disc he has left as grinding proceeds. The pointer and dial indicator might be used to indicate coarse disc wear and a suitable dial indicator 336, also shown through window 332, may be mounted on the lug 134 on the quill, as at 338 in FIGURE 6, to indicate fine wheel wear, and also may be used to accurately indicate the amount of infeed. The dial indicator may carry a feeler or stem 340, shown in FIGURES 5, 7 and 9, to sense an adjustable stud or abutment 342 mounted in the head. This stud or abutment 342 may be adjusted to "zero" the dial indicator.

The infeed arrangement shown in FIGURES 9, 12 and 13 has the advantage that an infinite number of infeeds may be used. Both feeds have the advantage that the disc may be manually fed at all times and the operator never loses control. On the ratchet feed, the cross shaft has hand wheels both front and back, as shown in FIGURE 7. It should be understood that with the ratchet type feed, the unit may have front and back hand wheels, whereas with the cam type feed of FIGURE 12, only the front or back hand wheel is used. The drawings should be interpreted accordingly.

The coolant connection, shown best in FIGURE 4, has the advantage that the disc spindle may rotate and reciprocate and the connection stays tight. In addition, it is compactly located on the outer end of the head.

Factory adjustment of a grinder of this type prior to shipment to a customer is important. The three point contact or support for the heads insures that the disc faces may be made precisely parallel. The gauging surfaces may be "zeroed" and thereafter in the field the grinder can always be brought back to zero or the head may be tilted horizontally, or vertically, or both, any desired amount, insuring the desired face settings without going through an elaborate realignment procedure. A reference distance is fixed on the gauging surfaces, say between surface 54 and plug 53, although it could be between plug 53 and any other surface. The point is that this reference distance is established and applied to the machine at the factory. The buttons are adjusted and set at the reference distance. Thereafter, in the field the operator knows that when he zeroes his dial indicator on the reference distance, the two coordinates should check out to this same distance when the grinding discs are precisely parallel. The reference distance is, in a sense, built on to the machine and the operator is never in doubt as to what distance he should set on his dial indicator or how he should zero it.

It is very important to have as little vibration on the quills as possible since any such vibrations will go directly into the grinding head. Therefore, the arrangement, shown in FIGURE 3, of having the motors mounted on the sub-slide and bearing against the base has the distinct advantage that motor vibrations will be substantially if not completely dampened out before they get to the spindle.

The invention has been explained in connection with a double disc grinder and it should be understood that many of the inventive features may be used on a single disc grinder. Also, the discs have been shown disposed on horizontal axes, but they might be vertical or otherwise. The actuating cylinders, such as the quill cylinders, the cylinder for the spacer block, etc., have been referred to as air cylinders but they might be hydraulic or otherwise.

Another important feature is that the quill cylinders, one on each side of the quill, are horizontally aligned and in the same plane with the quill axis which insures a uniform axial movement of the quill during rapid traverse without uneven or offset moments. It is also important to note that either during grinding or dressing, the outward thrust or bias of the quill cylinders adds to the normal or natural outward thrust from grinding or dressing and is not in opposition to it. Thus, at no time can the outward thrust from the work or from dressing overcome the thrust or pressure from the quill cylinders, which would allow backlash to spoil accuracy. The two thrusts add and, as such, such backlash is completely eliminated.

Another advantage is that when a disc has been replaced and the new one dressed off, the machine will bring the face of the new disc precisely and accurately back to grinding position. After dressing, the disc will be moved in by a distance exactly equal to the thickness of the spacer block. When a grinding operation begins, the operator knows that the freshly dressed faces of the new discs are an exact distance apart. Thus, he does not have to hunt or recheck the spacing between the disc faces at grinding position before starting a new grinding operation.

Another advantage is that the head settings are not changed in the process of making wheel changes. The settings at the gauging surfaces 46 remain the same. Assume that the head has a combination horizontal and vertical tilt, which is often the case. The quill may be moved out beyond dressing position, the disc changed, the new disc dressed off and moved back to grinding position and the settings on the gauging surfaces 46 remain the same. The sub-slide setting stays the same. In prior machines wheel changes have involved a complete readjustment and recheck of all settings, which is time consuming and slows down production.

In FIGURE 1, the control panel 312 is shown as mounted on a bracket or upright 344 which is connected to the base 10. This bracket is a combination junction box and bracket. And the cover 346 is removably mounted to expose various terminal strips. Terminal strips might also be used in the back of the push button station 312. Each end of the base is provided with suitable connections 348, one at each corner, shown in this case as a pipe tap with a plug so that the user can bring the power lines into the junction box from any one of four locations, whichever is the most convenient. This greatly simplifies the over-all wiring of the machine and makes installation much easier.

Face grinding may be accomplished by a simple attachment and it should be noted that during face grinding backlash is eliminated by the quill cylinders.

Whereas the preferred form and several variations of the invention have been shown, described and suggested, it should be understood that suitable additional modifications, changes, substitutions, alterations and variations may be made without departing from the invention's fundamental theme. It is, therefore, wished that the invention be unrestricted, except as by the appended claims.

We claim:

1. In a double disc grinder, a base, opposed grinding discs mounted for rotation thereon, a support on the base for each disc, the supports with the discs being movable toward and from each other between a forward grinding position and a withdrawn dressing position, means for feeding the discs toward each other, means applying an outward bias to the supports while in either position to eliminate backlash in the feeding means, the base including a sub-slide and a housing on the sub-slide, the support including a quill in the housing, the disc being rotatably mounted in the quill, the outward bias means including two cylinders, one on each side of the housing connected between the housing and the quill and disposed generally in the same horizontal plane with the disc axis.

2. In a double disc grinder, a base, opposed grinding discs mounted for rotation thereon, a support on the base for each disc, the supports with the discs being movable toward and from each other between a forward grinding position and a withdrawn dressing position, means for feeding the discs toward each other, means applying an outward bias to the supports while in either position to eliminate backlash in the feeding means, the feeding means including a nut mounted on the base, a screw in mesh with the nut and having a surface constructed to abut a surface on the support so that movement of the screw in one direction will cause movement of the support, means for rotating the nut to cause feeding movement of the screw, the outward bias means being effective to bias the support outwardly tending to keep the abutting surfaces in contact, a spacer element positionable between the abutting surfaces to separate the surfaces by a distance equal to the distance between the grinding and dressing positions of the discs, and means for inserting and withdrawing the spacer element between the abutting surfaces, the spacer element, when inserted, being effective to transmit the thrust of the bias means to the meshing screw and nut to eliminate backlash when the disks are in grinding position and, when withdrawn, allowing the outward bias means to move the support outwardly until the abutting surfaces contact to eliminate backlash during dressing.

3. In a double disc grinder, a housing, opposed grinding discs mounted for rotation thereon about aligned axes, a support on the housing for each disc movably mounted relative to each other to move the discs between a forward grinding position and a withdrawn dressing position, means for incrementally feeding the discs toward each other, cylinders for rapidly traversing the supports back and forth between grinding and dressing positions and for applying an outward bias to eliminate backlash in the incremental feeding means when the supports are in grinding and dressing positions, said incremental feeding means including a nut mounted on the housing, a screw in mesh with the nut and having a surface abutting a surface on the support so that rotation of the nut will cause movement of the support, means for rotating the nut to cause incremental feeding movement of the screw, a spacer block insertable between the abutting surfaces on the screw and support, and means for inserting and withdrawing the spacer block so that when the block is inserted between the abutting surfaces with the discs in grinding position and the cylinders applying an outward bias, backlash will be eliminated in the screw and nut and, when the spacer block is withdrawn, the cylinders may rapidly traverse the supports outwardly to dressing position until the abutting surfaces contact, thereby eliminating backlash in the nut and screw during dressing.

4. The structure of claim 3 further characterized by and including a dressing tool having oppositely disposed diamonds spaced a predetermined distance apart and adapted to be passed between the discs in their dressing position, the width of the spacer blocks being equal to the difference between the spacing of the discs in grinding and dressing positions.

5. The structure of claim 3 further characterized by and including means for actuating the nut when the supports are in dressing position to effect an incremental infeed of the discs in opposition to the outward bias of the cylinders just prior to a dressing operation.

6. In a double disc grinder, a housing, opposed coaxially mounted grinding discs on the housing, a support on the housing for each disc movably mounted thereon for adjustment of the disc faces, inner and outer mountings for each support providing limited vertical and horizontal pivotal movement about the inner mounting, and gauging surfaces on the housing and support for measuring the horizontal and vertical relations of the housing and support when the faces of the grinding discs are properly aligned, including adjustable buttons on one disposed at an angle to each other, and a projection on the other opposite each of the buttons so that the distance between each of the buttons and the projection may be made equal by adjusting the buttons.

7. The structure of claim 6 further characterized in that the gauging surfaces include an angle having adjustable buttons thereon disposed at 90° to each other, a projection including a mounting for a dial indicator to check the distance between the projection and the buttons, and further including a formation defining a reference distance so that the dial indicator may be set prior to checking and adjusting the buttons.

8. In a double disc grinder, a housing, opposed grinding discs mounted for rotation thereon about aligned axes, a support on the housing for each disc movably mounted relative to each other to move the discs toward and from grinding position, and means for incrementally feeding the discs toward and from each other, including nut and screw elements in mesh with each other, one being connected to the housing and the other being connected to the support, means for rotating one of the elements to effect incremental feeding movement of the support and disc, and means for oscillating the other element to reciprocate the disc at grinding position for face grinding.

9. The structure of claim 8 further characterized in that the nut element is connected to and rotatably mounted on the housing and the screw element is connected to and rotatably mounted on the support.

10. In a double disc grinder, a housing, opposed grinding discs mounted thereon for rotation about aligned axes, a support on the housing for each disc movably mounted relative to each other to move the discs between a forward grinding position and a withdrawn dressing position, means for rapidly traversing the supports and discs between grinding and dressing positions, means for incrementally feeding the discs toward each other for two extents of movement, the lesser to compensate for wheel wear and the greater for a dressing operation, and means for simultaneously adjusting the infeed of both.

11. The structure of claim 10 further characterized in that the incremental feeding means includes a pawl and ratchet mechanism.

12. The structure of claim 10 further characterized in that the incremental feeding means includes an electrically operated clutch.

13. In a double disc grinder, a housing, opposed grinding discs mounted for rotation thereon about aligned axes, a support for each disc including a quill movably mounted relative to the housing to move the disc between a forward grinding position and a withdrawn dressing position, means for rapidly traversing the quills back and forth between grinding and dressing positions, means for incrementally feeding the quills toward each other to compensate for disc wear, a disc change control on the grinder, and means responsive to actuation of the disc change control for automatically reversing the incremental feeding means.

14. In a double disc grinder having grinding discs mounted for rotation about generally aligned axes with opposed grinding faces disposed generally parallel for workpieces to be ground to be passed between them, the grinding discs being movable toward and away from each other between a grinding position and a dressing position, means for moving the discs a predetermined distance inwardly and outwardly between grinding and dressing positions, means for applying an outward bias to the grinding discs when in grinding position during grinding and when in dressing position during dressing, and means for automatically infeeding the discs a predetermined increment immediately after movement from grinding to dressing position just prior to a dressing operation so that a certain amount of the disc faces will be removed during dressing.

15. In a double disc grinder, a housing, opposed grinding discs mounted thereon for rotation about aligned axes, a support on the housing for each disc movably mounted relative to each other to move the discs between a forward grinding position and a withdrawn dressing position, and means for incrementally feeding the discs toward each other, including a shaft connected to the support such that rotation of the shaft will move the support, power means for rotating the shaft, a control for the shaft, a clutch between the shaft and the control, a disc on the control having stops therefor, at least one of the stops being adjustably positioned, a switch positioned to be engaged by a stop, and a circuit interconnecting the clutch and the switch such that differential positioning of the said one stop will vary the length of incremental infeed.

16. The structure of claim 15 further characterized by and including a second clutch betewen the power means and including a second clutch between the power means that they are operative at the same time and vice versa.

17. The structure of claim 15 further characterized by and including manually operable means accessible on the outside of the housing for differentially positioning at least one of the stops so that the length of an incremental infeed may be changed from outside the housing.

18. The structure of claim 15 further characterized by and including a spring tending to rotate the disc in one direction, one of the stops being on the housing and fixed relative to the disc, at least one stop on the disc adapted to engage the stop on the housing when the disc is rotated freely by the spring and also positioned to engage the switch when the disc is rotated in the other direction by the power means.

19. The structure of claim 18 further characterized in that the stop on the disc is constructed to be variably positioned circumferentially thereof.

20. In a double disc grinder, a housing, opposed grinding discs mounted for rotation thereon about aligned axes, a support on the housing for each disc movably mounted relative to each other between a forward grinding position and a withdrawn dressing position, feeding means for incrementally feeding each support and disc toward grinding position, cylinders for rapidly traversing each support back and forth between grinding and dressing positions and for applying an outward bias to the support to eliminate backlash in the feeding means when the support and disc are in grinding and dressing positions, abutting surfaces between the feeding means and the support, a spacer block insertable between the abutting surfaces, and means for inserting and withdrawing the spacer block so that when the block is inserted between the abutting surfaces with the discs in grinding position and the cylinders applying an outwardly bias, backlash will be eliminated in the feeding means, and when the spacer block is withdrawn, the cylinders may rapidly traverse the support outwardly to dressing position until the abutting surfaces contact, thereby eliminating backlash in the feeding means during dressing.

21. The structure of claim 20 further characterized in that the feeding means includes a nut mounted on the housing, and a screw in mesh with the nut, means for rotating the nut to cause incremental feeding movement of the screw, and further including means for automatically actuating the feeding means to cause an incremental infeed of the grinding discs when the supports and discs move out to dressing position.

References Cited in the file of this patent

UNITED STATES PATENTS

| | | |
|---|---|---|
| 191,640 | Beck | June 5, 1877 |
| 2,004,426 | Booth et al. | June 11, 1935 |
| 2,085,005 | Cole | June 29, 1937 |
| 2,089,040 | Shoe | Aug. 3, 1937 |
| 2,251,961 | Snader | Aug. 12, 1941 |
| 2,424,448 | Gardner et al. | July 22, 1947 |
| 2,656,653 | Gardner | Oct. 27, 1953 |
| 2,826,008 | Dunn | Mar. 11, 1958 |
| 2,926,466 | Dunn | Mar. 1, 1960 |
| 2,958,232 | Benninghoff et al. | Nov. 1, 1960 |